(12) United States Patent
George-Svahn et al.

(10) Patent No.: US 9,619,020 B2
(45) Date of Patent: Apr. 11, 2017

(54) DELAY WARP GAZE INTERACTION

(71) Applicant: Tobii AB, Danderyd (SE)

(72) Inventors: Erland George-Svahn, Stockholm (SE); David Figgins Henderek, Stockholm (SE); Rebecka Lannsjö, Stockholm (SE); Mårten Skogö, Danderyd (SE); John Elvesjö, Stockholm (SE)

(73) Assignee: Tobii AB, Danderyd (SE)

( * ) Notice: Subject to any disclaimer, the term of this patent is extended or adjusted under 35 U.S.C. 154(b) by 0 days.

(21) Appl. No.: 14/195,789

(22) Filed: Mar. 3, 2014

(65) Prior Publication Data

US 2014/0247215 A1 Sep. 4, 2014

Related U.S. Application Data

(60) Provisional application No. 61/771,659, filed on Mar. 1, 2013, provisional application No. 61/905,536, filed on Nov. 18, 2013.

(51) Int. Cl.
*G06F 3/033* (2013.01)
*G06F 3/01* (2006.01)
(Continued)

(52) U.S. Cl.
CPC ............... *G06F 3/013* (2013.01); *G06F 3/02* (2013.01); *G06F 3/0227* (2013.01); *G06F 3/033* (2013.01); *G06F 3/041* (2013.01); *G06F 3/0481* (2013.01)

(58) Field of Classification Search
None
See application file for complete search history.

(56) References Cited

U.S. PATENT DOCUMENTS 5,471,542 A 11/1995 Ragland
5,731,805 A 3/1998 Tognazzini et al.
(Continued)

FOREIGN PATENT DOCUMENTS

CN 105339866 2/2016
EP 0816980 1/1998
(Continued)

OTHER PUBLICATIONS

U.S. Appl. No. 13/894,424, Non-Final Office Action mailed on Dec. 19, 2014, 32 pages.
(Continued)

*Primary Examiner* — Joseph Haley
*Assistant Examiner* — Ifedayo Iluyomade
(74) *Attorney, Agent, or Firm* — Kilpatrick Townsend & Stockton LLP

(57) ABSTRACT

A computer system can be controlled with non-contact inputs, such as eye-tracking devices. A visual indicator can be presented on a display to indicate the location where a computer function will take place (e.g., a common cursor). The visual indicator can be moved to a gaze target in response to continued detection of an action (e.g., touchpad touch) by a user for a predetermined period of time. A delay between the action and the movement of the visual indicator can allow a user time to "abort" movement of the visual indicator. Additionally, once the visual indicator has moved, the visual indicator can be controlled with additional precision as the user moves the gaze while continuing the action (e.g., continued holding of the touchpad).

21 Claims, 33 Drawing Sheets

(51) Int. Cl.
   *G06F 3/02*      (2006.01)
   *G06F 3/041*     (2006.01)
   *G06F 3/0481*    (2013.01)

(56)            References Cited

U.S. PATENT DOCUMENTS

| | | | |
|---|---|---|---|
| 5,850,211 A | 12/1998 | Tognazzini | |
| 6,067,565 A | 5/2000 | Horvitz | |
| 6,085,226 A | 7/2000 | Horvitz | |
| 6,204,828 B1* | 3/2001 | Amir | G06F 3/013 345/156 |
| 6,351,273 B1 | 2/2002 | Lemelson et al. | |
| 6,393,584 B1 | 5/2002 | McLaren et al. | |
| 6,421,064 B1 | 7/2002 | Lemelson et al. | |
| 6,578,962 B1 | 6/2003 | Amir et al. | |
| 6,603,491 B2 | 8/2003 | Lemelson et al. | |
| 6,734,845 B1 | 5/2004 | Nielsen et al. | |
| 6,873,314 B1 | 3/2005 | Campbell | |
| 6,882,354 B1 | 4/2005 | Nielsen | |
| 6,886,137 B2 | 4/2005 | Peck et al. | |
| 7,013,258 B1 | 3/2006 | Su et al. | |
| 7,091,928 B2 | 8/2006 | Rajasingham | |
| 7,113,170 B2 | 9/2006 | Lauper et al. | |
| 7,346,195 B2 | 3/2008 | Lauper et al. | |
| 7,486,302 B2 | 2/2009 | Shoemaker | |
| 7,572,008 B2 | 8/2009 | Elvesjo et al. | |
| 7,614,011 B2 | 11/2009 | Karidis et al. | |
| 7,630,254 B2 | 12/2009 | Lutze | |
| 7,630,524 B2 | 12/2009 | Lauper et al. | |
| 7,634,528 B2 | 12/2009 | Horvitz et al. | |
| 7,792,391 B2 | 9/2010 | Arima | |
| 8,094,122 B2 | 1/2012 | Molander et al. | |
| 8,226,574 B2 | 7/2012 | Whillock et al. | |
| 8,235,529 B1 | 8/2012 | Raffle et al. | |
| 8,339,446 B2 | 12/2012 | Blixt et al. | |
| 8,407,263 B2 | 3/2013 | Elad et al. | |
| 8,564,533 B2 | 10/2013 | Yuan | |
| 8,620,913 B2 | 12/2013 | Hough et al. | |
| 8,643,680 B2 | 2/2014 | Baldwin et al. | |
| 8,756,516 B2 | 6/2014 | Singh et al. | |
| 8,762,846 B2 | 6/2014 | Chen et al. | |
| 8,786,953 B2 | 7/2014 | Wheeler et al. | |
| 8,963,806 B1 | 2/2015 | Starner et al. | |
| 2002/0105482 A1 | 8/2002 | Lemelson et al. | |
| 2002/0180799 A1 | 12/2002 | Peck et al. | |
| 2003/0020755 A1 | 1/2003 | Lemelson et al. | |
| 2003/0052903 A1 | 3/2003 | Weast | |
| 2003/0098954 A1 | 5/2003 | Amir et al. | |
| 2004/0175020 A1 | 9/2004 | Bradski et al. | |
| 2004/0199663 A1 | 10/2004 | Horvitz et al. | |
| 2005/0030322 A1 | 2/2005 | Gardos et al. | |
| 2005/0047629 A1* | 3/2005 | Farrell | G06F 3/013 382/117 |
| 2005/0221268 A1 | 10/2005 | Chaar et al. | |
| 2006/0066567 A1 | 3/2006 | Scharenbroch et al. | |
| 2006/0087502 A1 | 4/2006 | Karidis et al. | |
| 2006/0192775 A1 | 8/2006 | Nicholson et al. | |
| 2007/0078552 A1 | 4/2007 | Rosenberg | |
| 2007/0122064 A1 | 5/2007 | Arima | |
| 2007/0132663 A1 | 6/2007 | Iba et al. | |
| 2007/0164990 A1 | 7/2007 | Bjorklund et al. | |
| 2007/0279591 A1 | 12/2007 | Wezowski et al. | |
| 2008/0074389 A1 | 3/2008 | Beale | |
| 2008/0114614 A1 | 5/2008 | Mahesh et al. | |
| 2008/0148149 A1 | 6/2008 | Singh et al. | |
| 2008/0270474 A1 | 10/2008 | Flake et al. | |
| 2008/0281915 A1 | 11/2008 | Elad et al. | |
| 2009/0146950 A1 | 6/2009 | Maringelli | |
| 2009/0245600 A1 | 10/2009 | Hoffman et al. | |
| 2009/0273562 A1 | 11/2009 | Baliga et al. | |
| 2009/0315827 A1 | 12/2009 | Elvesjö et al. | |
| 2010/0079508 A1 | 4/2010 | Hodge et al. | |
| 2010/0125816 A1 | 5/2010 | Bezos | |
| 2010/0182232 A1 | 7/2010 | Zamoyski | |
| 2010/0225668 A1 | 9/2010 | Tatke et al. | |
| 2010/0295774 A1 | 11/2010 | Hennessey | |
| 2011/0045810 A1 | 2/2011 | Issa et al. | |
| 2011/0115703 A1 | 5/2011 | Iba et al. | |
| 2011/0115883 A1 | 5/2011 | Kellerman et al. | |
| 2011/0119361 A1 | 5/2011 | Issa et al. | |
| 2011/0175932 A1 | 7/2011 | Yu et al. | |
| 2011/0270123 A1 | 11/2011 | Reiner | |
| 2012/0011170 A1 | 1/2012 | Elad et al. | |
| 2012/0050273 A1 | 3/2012 | Yoo et al. | |
| 2012/0105486 A1 | 5/2012 | Lankford et al. | |
| 2012/0256967 A1 | 10/2012 | Baldwin et al. | |
| 2012/0272179 A1* | 10/2012 | Stafford | G06F 3/012 715/781 |
| 2013/0044055 A1 | 2/2013 | Karmarkar et al. | |
| 2013/0132867 A1 | 5/2013 | Morris et al. | |
| 2013/0135196 A1 | 5/2013 | Park et al. | |
| 2013/0169560 A1 | 7/2013 | Cederlund et al. | |
| 2013/0176208 A1 | 7/2013 | Tanaka et al. | |
| 2013/0176250 A1 | 7/2013 | Lee et al. | |
| 2013/0275883 A1 | 10/2013 | Bharshankar et al. | |
| 2013/0283208 A1 | 10/2013 | Bychkov et al. | |
| 2013/0300654 A1 | 11/2013 | Seki | |
| 2013/0321400 A1 | 12/2013 | van Os et al. | |
| 2014/0002352 A1 | 1/2014 | Jacob et al. | |
| 2014/0019136 A1 | 1/2014 | Tanaka | |
| 2014/0126782 A1 | 5/2014 | Takai et al. | |
| 2014/0168054 A1 | 6/2014 | Yang et al. | |
| 2014/0184550 A1 | 7/2014 | Hennessey et al. | |
| 2014/0191948 A1 | 7/2014 | Kim et al. | |
| 2014/0195918 A1 | 7/2014 | Friedlander | |
| 2014/0247208 A1 | 9/2014 | Henderek et al. | |
| 2014/0247210 A1 | 9/2014 | Henderek et al. | |
| 2014/0247232 A1 | 9/2014 | George-Svahn et al. | |
| 2014/0268054 A1 | 9/2014 | Olsson et al. | |
| 2014/0334666 A1 | 11/2014 | Lankford et al. | |
| 2015/0138079 A1 | 5/2015 | Lannsjö | |
| 2015/0138244 A1 | 5/2015 | George-Svahn et al. | |
| 2015/0143293 A1 | 5/2015 | George-Svahn et al. | |
| 2016/0116980 A1 | 4/2016 | George-Svahn et al. | |

FOREIGN PATENT DOCUMENTS

| | | |
|---|---|---|
| EP | 0816980 | 11/1998 |
| EP | 0903662 | 3/1999 |
| EP | 0912932 | 5/1999 |
| EP | 0816980 | 1/2001 |
| EP | 1646026 | 4/2006 |
| EP | 0912932 | 8/2006 |
| EP | 1812881 | 8/2007 |
| EP | 1832753 | 9/2007 |
| EP | 1970649 | 9/2008 |
| EP | 2048326 | 4/2009 |
| EP | 1646026 | 9/2009 |
| EP | 2075430 | 7/2010 |
| EP | 2613224 | 7/2013 |
| EP | 2695046 | 2/2014 |
| EP | 2752733 | 7/2014 |
| EP | 2762997 | 8/2014 |
| EP | 2962175 | 6/2016 |
| GB | 2490864 | 11/2012 |
| WO | 9803907 | 1/1998 |
| WO | 2006045843 | 5/2006 |
| WO | 2010051037 | 5/2010 |
| WO | 2010127714 | 11/2010 |
| WO | 2010132991 | 11/2010 |
| WO | 2010141403 | 12/2010 |
| WO | 2012138744 | 10/2012 |
| WO | 2012145180 | 10/2012 |
| WO | 2013033842 | 3/2013 |
| WO | 2013144807 | 10/2013 |
| WO | 2013168171 | 11/2013 |
| WO | 2013168173 | 11/2013 |
| WO | 2014134623 | 9/2014 |

OTHER PUBLICATIONS

Kumar et al., "Gaze-enhanced Scrolling Techniques", Oct. 7, 2007, 4 pages.

(56) References Cited

OTHER PUBLICATIONS

PCT/US2014/020024, "International Search Report and Written Opinion", Jul. 29, 2014, 15 pages.
PCT/US2014/020024, "International Preliminary Report on Patentability", mailed Sep. 11, 2015, 11 pages.
European Patent Application No. 14716455.2; Communication Pursuant to Rules 161(1) and 162 EPC; Oct. 23, 2015; 2 pages.
U.S. Appl. No. 13/802,240, "Final Office Action", Jun. 23, 2015, 14 pages.
U.S. Appl. No. 13/802,240, "Non-Final Office Action", Mar. 20, 2015, 20 pages.
U.S. Appl. No. 13/894,424, "Final Office Action", May 8, 2015, 35 pages.
"Adjacent", Dictionary.com, http://dictionary.reference.com/browse/adjacent, Nov. 18, 2011, 1 page.
Non-Final Office Action for U.S. Appl. No. 13/802,240, mailed Nov. 13, 2015, 11 pages.
Non-Final Office Action for U.S. Appl. No. 14/195,743, mailed Dec. 15, 2015, 45 pages.
Final Office Action for U.S. Appl. No. 13/802,240, mailed Mar. 3, 2016, 13 pages.
Notice of Publication for Chinese Patent Application No. CN201480024417, mailed Feb. 24, 2016, 64 pages (1 page For translation, 2 pages for CN Notice, 61 pages for pamphlet).
European Application No. 16174545.0, Extended European Search Report mailed on Oct. 4, 2016, 7 pages.
Non-Final Office Action for U.S. Appl. No. 14/547,087, mailed May 20, 2016, 32 pages.
Non-Final Office Action for U.S. Appl. No. 14/600,896, mailed Jun. 30, 2016, 13 pages.
U.S. Appl. No. 13/802,240, Non-Final Office Action mailed on Sep. 23, 2016, 20 pages.
U.S. Appl. No. 14/195,743, Final Office Action mailed on Oct. 6, 2016, 16 pages.
European Application No. 14716455.2, Office Action mailed on Sep. 30, 2016, 5 pages.
European Application No. 16174545.0, Office Action mailed on Jul. 1, 2016, 1 page.

\* cited by examiner

| | Track Status |
|---|---|
| ⊙ | Place Cursor |
| ⇕ | Gaze Scroll |
| 🖱 | Left Click |
| 🖱 | Double Click |
| 🖱 | Right Click |
| ↪ | Gaze Drag & Drop |
| ⌨ | Gaze Keyboard |
| ⚙ | Settings |

FIG. 10

DELAY WARP GAZE INTERACTION

CROSS REFERENCE TO RELATED APPLICATIONS

The present application claims the benefit of U.S. Provisional Patent Application No. 61/771,659 filed Mar. 1, 2013 and U.S. Provisional Patent Application No. 61/905.536 filed Nov. 18, 2013, both of which are hereby incorporated by reference in their entirety. The present application further incorporates by reference U.S. patent application Ser. No. 13/802,240 filed Mar. 13, 2013.

TECHNICAL FIELD

The present disclosure relates to human-computer interaction generally and more specifically to gaze detection.

BACKGROUND

Human-computer interaction generally relates to the input of information to and control of a computer by a user. Many common and popular computer programs and operating systems have been developed to function primarily with input methods involving physical contact or manipulation (e.g., a mouse or a keyboard). This type of physical input method is referred to herein as contact-required input. It can be difficult for people who desire to use non-contact input methods to interact with these computer programs and operating systems to their full potential. Some people must use non-contact input methods for various reasons (e.g., because of an injury or disability).

An example of a non-contact input device is an eye tracking device such as that described in U.S. Pat. No. 7,572,008. Eye tracking devices can operate on the principal of illuminating an eye with infrared light and utilizing an image sensor to detect reflection of the light off the eye. A processor can use the image sensor's data to calculate the direction of a user's gaze.

However, as technology progresses, computer programs and operating systems incorporate new forms of human-computer interaction, based on contact-required inputs, to enable both simple and complex functionality. An example of a form of human-computer interaction is touch-based interaction on a computer, tablet, phone or the like, whereby a user interacts with the device by touching and by performing gestures (e.g., multi-finger gestures) on a touch-sensitive device (e.g., a touchscreen). This and other forms of user interaction require a very physical connection between the device and the user, often requiring multiple points of physical contact between the user and the touch-sensitive device (e.g., for multi-finger gestures).

It can be desirable to develop human-computer interaction methods based on non-contact inputs with the ability to perform both simple and complex functionality. It can be further desirable to develop human-computer interaction methods based on non-contact inputs that can function effectively on computing devices developed for use primarily with contact-required inputs.

Many non-contact interactions lack the clear definition and identification of contact methods, therefore it can sometimes be ambiguous as to the intention of a non-contact input command. In order to assist with this problem, it has previously been proposed to utilize a non-contact input such as eye-tracking with a contact-required input device, such as a computer mouse or touchpad. For example, U.S. Pat. No. 6,204,828 describes a system whereby display of a cursor on screen is suspended and displayed at a user's gaze location upon movement by a computer mouse.

Some interaction methods are not intuitive and the user may not know for sure if the eye tracking is functioning or the exact location of the cursor. Some interaction methods result in a cognitive disruption whereby after the user has triggered a movement of a cursor, the user must anticipate the future location of the cursor and adjust accordingly.

It can be desirable to signal to the user as early as possible the future location of the cursor while determining whether the user intends on triggering a mouse movement. Further, as eye tracking systems may not provide 100% accuracy, the determined gaze position to which a cursor will move may not be the position intended by the user. It can be desirable to assist a user with more accurately determining how and when to use a non-contact input, such as eye tracking, in combination with a contact-required input, such as a touchpad or mouse.

SUMMARY

The term "embodiment" and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

Embodiments of the present disclosure include computer systems that can be controlled with non-contact inputs through zonal control. In one embodiment, a non-contact input tracks a non-contact action performed by a user. A computer's display, and beyond, can be separated into a number of discrete zones according to a configuration. Each zone is associated with a computer function. The zones and/or their functions can, but need not, be indicated to the user. The user can perform the various computer functions by performing non-contact actions detected by the non-contact input. Upon indicating a desired zone associated with a particular function, the user can provide an activation signal of intent. The activation signal of intent can be a contact-required or non-contact action, such as a button press or dwelling gaze, respectively. Upon receiving the activation signal of intent, the computer system can use the indicated zone (e.g., indicated by the user's non-contact actions) to perform the function associated with that zone.

Embodiments of the present disclosure include a computer system that can be controlled with non-contact inputs, such as eye-tracking devices. A visual indicator can be presented on a display to indicate the location where a computer function will take place (e.g., a common cursor). The visual indicator can be moved to a gaze target in response to continued detection of an action (e.g., touchpad touch) by a user for a predetermined period of time. A delay between the action and the movement of the visual indicator provides an opportunity to provide an indication to the user where the visual indicator will be located after a movement, allowing for less of a cognitive disruption after the visual indicator has appeared at a new location. Optionally, the delay can also allow a user time to "abort" movement of the visual indicator. Additionally, once the visual indicator has moved, the visual indicator can be controlled with additional precision as the user moves gaze while continuing the action (e.g., continued holding of the touchpad).

Embodiments of the present disclosure include a computer system that can be controlled with non-contact inputs, such as eye-tracking devices. A computer can enlarge a portion of a display adjacent a first gaze target in response to detecting a first action (e.g., pressing a touchpad). The computer can then allow a user to position a second gaze target in the enlarged portion (e.g., by looking at the desired location) and perform a second action in order to perform a computer function at that location. The enlarging can allow a user to identify a desired location for a computer function (e.g., selecting an icon) with greater precision.

Embodiments of the present disclosure include a computer system that can be controlled with non-contact inputs, such as eye-tracking devices. Various combinations of non-contact actions and contact-required actions can be performed to cause a computer to perform certain computer functions. Functions can include scroll functions, movements of visual indicators, zooming of the display, and selecting further functions to perform. Combinations of non-contact actions and contact-required actions can include pressing buttons and/or touching touch-sensitive devices while looking at certain places on or off of a display.

BRIEF DESCRIPTION OF THE DRAWINGS

The specification makes reference to the following appended figures, in which use of like reference numerals in different figures is intended to illustrate like or analogous components

FIG. 10 is a graphical depiction of a menu according to certain embodiments.

DETAILED DESCRIPTION

Figure 1:
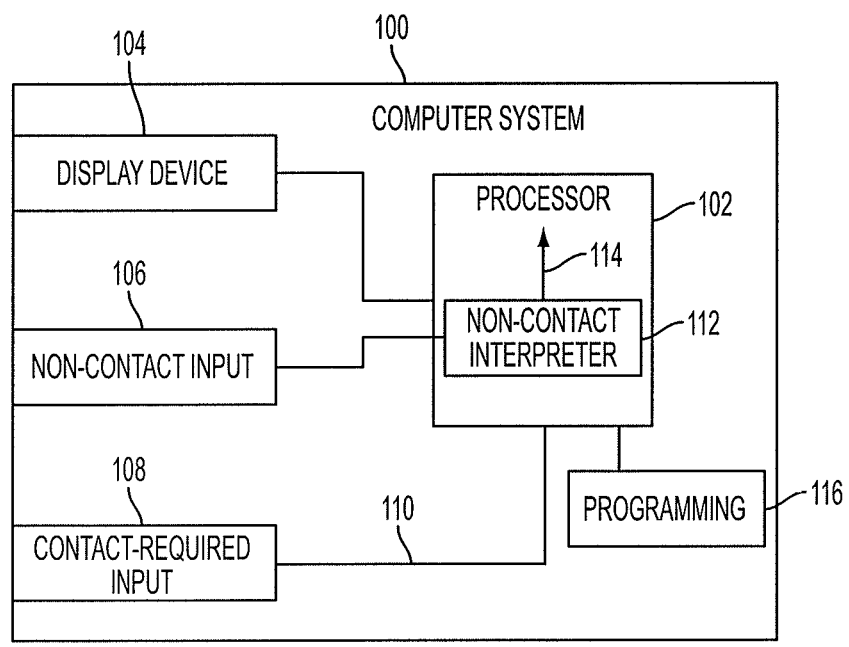
FIG. 1 is a schematic representation of a computer system incorporating non-contact inputs according to certain embodiments.

A computer system can be controlled with non-contact inputs through zonal control. In an embodiment, a non-contact input that is an eye-tracking device is used to track the gaze of a user. A computer's display can be separated into a number of discrete zones according to a configuration. Each zone is associated with a computer function. The zones and/or their functions can, but need not, be indicated to the user. The user can perform the various functions by moving gaze towards the zone associated with that function and providing an activation signal of intent. The activation signal of intent can be a contact-required or non-contact action, such as a button press or dwelling gaze, respectively.

A computer system can implement a delay warp when being controlled with non-contact inputs. In an embodiment, a cursor can be presented on a display to indicate the location where a computer function will occur upon a further action (e.g., a click). The cursor can be moved to a gaze target in response to continued detection of an action (e.g., continued touching of a touchpad) by a user for a predetermined period of time. A delay between the action and the movement of the cursor provides an opportunity to provide an indication to the user where the visual indicator will be located after a movement, allowing for less of a cognitive disruption after the visual indicator has appeared at a new location. Optionally, the delay gives a user an opportunity to "abort" movement of the cursor. Additionally, once the cursor has moved, the cursor can be further controlled with additional precision as the user moves gaze, moves a mouse, or swipes a touchpad while continuing the action (e.g., continued holding of the touchpad).

A computer system can allow for increased certainty and precision when targeting elements through non-contact inputs. In an embodiment, a user can look at a group of elements and perform an action. If the computer cannot determine with certainty which element is targeted by the user, the computer can enlarge and/or separate the elements and allow the user to further focus gaze on the desired element, whereupon performing a second action, the computer will perform the desired function (e.g., selecting an icon) upon the targeted element.

A computer system can be controlled through various combinations of non-contact actions and contact-required actions. Scrolling, cursor movements, zooming, and other functions can be controlled through combinations of non-contact actions and/or contact-required actions. Such combinations can include pressing buttons and/or touching touch-sensitive devices while looking at certain places on or off of a display.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may be drawn not to scale. As used herein, examples listed with the use of exempli gratia ("e.g.") are non-limiting examples.

FIG. 1 is a schematic representation of a computer system 100 incorporating non-contact inputs 106 according to certain embodiments. The computer system 100 (hereinafter, "computer") can be implemented in a single housing (e.g., a tablet computer), or can be implemented in several housings connected together by appropriate power and/or data cables (e.g., a standard desktop computer with a monitor, keyboard, and other devices connected to the main housing containing the desktop computer's CPU). As used herein, any reference to an element existing "in" the computer 100 indicates the element is a part of the computer system 100, rather than physically within a certain housing.

The computer 100 can include a processor 102 connected to or otherwise in communication with a display device 104, a non-contact input 106, and a contact-required input 108. The processor 102 can include a non-contact interpreter 112, as described in further detail below. As used herein, the term processor 102 refers to one or more individual processors within the computer system, individually or as a group, as appropriate. The computer 100 can include programming 116 stored on permanent, rewritable, or transient memory that enables the processor 102 to perform the functionality described herein, including zonal control, delay warp, and two-step click, as well as other functionality. The programming (e.g., computer-executable instructions or other code), when executed by the processor 102, causes the processor 102 to perform operations described herein. The programming may comprise processor-specific programming generated by a compiler and/or an interpreter from code written in any suitable computer-programming language. Non-limiting examples of suitable computer-programming languages include C, C++, C#, Visual Basic, Java, Python, Perl, JavaScript, ActionScript, and the like. The memory may be a computer-readable medium such as (but not limited to) an electronic, optical, magnetic, or other storage device capable of providing a processor with computer-readable instructions. Non-limiting examples of such optical, magnetic, or other storage devices include read-only ("ROM") device(s), random-access memory ("RAM") device(s), magnetic disk(s), magnetic tape(s) or other magnetic storage, memory chip(s), an ASIC, configured processor(s), optical storage device(s), floppy disk(s), CD-ROM, DVD, or any other medium from which a computer processor can read instructions.

Contact-required inputs 108 can be any device for accepting user input that requires physical manipulation or physical contact (hereinafter, "contact-required actions"). Examples of contact-required inputs 108 include keyboards, mice, switches, buttons, touchpads, touchscreens, touch-sensitive devices, and other inputs that require physical manipulation or physical contact. Examples of contact-required actions include tapping, clicking, swiping, pressing (e.g., a key), and others. As used herein, the term "contact-required actions" further include actions that require either physical contact through another device (e.g., using a touchscreen with a stylus) or close proximity to the contact-required input (e.g., hovering or swiping a finger above a touchscreen that responds to fingers in close proximity, such as a projected capacitance touchscreen). Signals generated from a user performing contact-required actions as received by contact-required inputs 108 are referred to as contact-based signals 110. Where appropriate, references to contact-required actions can include combinations of contact-required actions (e.g., holding a first button while pressing a second button).

Non-contact inputs 106 can be any device capable of receiving user input without physical manipulation or physical contact. Examples of non-contact inputs 106 include eye-tracking devices, microphones, cameras, light sensors, and others. When a user performs an action detectable by a non-contact input 106 (hereinafter, "non-contact action"), the non-contact interpreter 112 generates a non-contact signal 114 based on the non-contact action performed by the user. Non-contact actions can include moving gaze (e.g., moving the direction of the gaze of one or more eyes), gaze saccade, fixating gaze, dwelling gaze (e.g., fixating gaze substantially at a single target for a predetermined length of time), a blink (e.g., blinking one or more eyes once or in a discernible pattern, or closing one or both eyes for a longer length of time), performing vocal commands (e.g., saying "click" or "open"), facial recognition (e.g., recognizing features and movements of the user's face), 3-D gestures (e.g., recognizing movements of a user, a user's appendage, or an object held by the user in 3-D space, such as waving), and others. Depending on the action performed, the non-contact interpreter 112 can send different non-contact signals 114. For example, a user moving gaze can result in a first non-contact signal 114 containing information about the movement and/or new direction of gaze, while a user blinking can result in a non-contact signal 114 indicative that the user blinked. The non-contact signal 114 can be used by the processor 102 to perform various tasks, as described in further detail below. Where appropriate, references to non-contact actions can include combinations of non-contact actions (e.g., blinking while saying "click").

Additionally, where appropriate, references to an action can include combinations of contact-required actions and non-contact actions (e.g., holding a button while saying "click").

In some embodiments, the processor 102 can use non-contact signals 114 to emulate contact-required signals 110. For example, the processor 102 can use non-contact signals 114 containing information about a user moving gaze to a first target (e.g., computer icon) and dwelling gaze on that target in order to emulate contact-required signals 110 of moving a cursor to the first target and clicking on that target.

The embodiments disclosed herein include the use of non-contact actions and contact-required actions, or non-contact actions alone, to perform various computer functions. Computer functions can be any type of action performable on a computer, such as a mouse click; a scroll/pan action; a magnifying action; a zoom action; a touch input/action; a gesture input/action; a voice command; a call-up of a menu; the activation of Eye Tracking/Eye Control/Gaze interaction; the pausing of Eye Tracking/Eye Control/Gaze interaction; adjusting the brightness of the backlight of the device; activating sleep, hibernate, or other power saving mode of the device; resuming from sleep, hibernate, or other power saving mode of the device; or others. In some cases, the computer functions are emulated such that the computer 100 behaves as if it is detecting solely a contact-required action.

Zonal Control

Figure 2A:
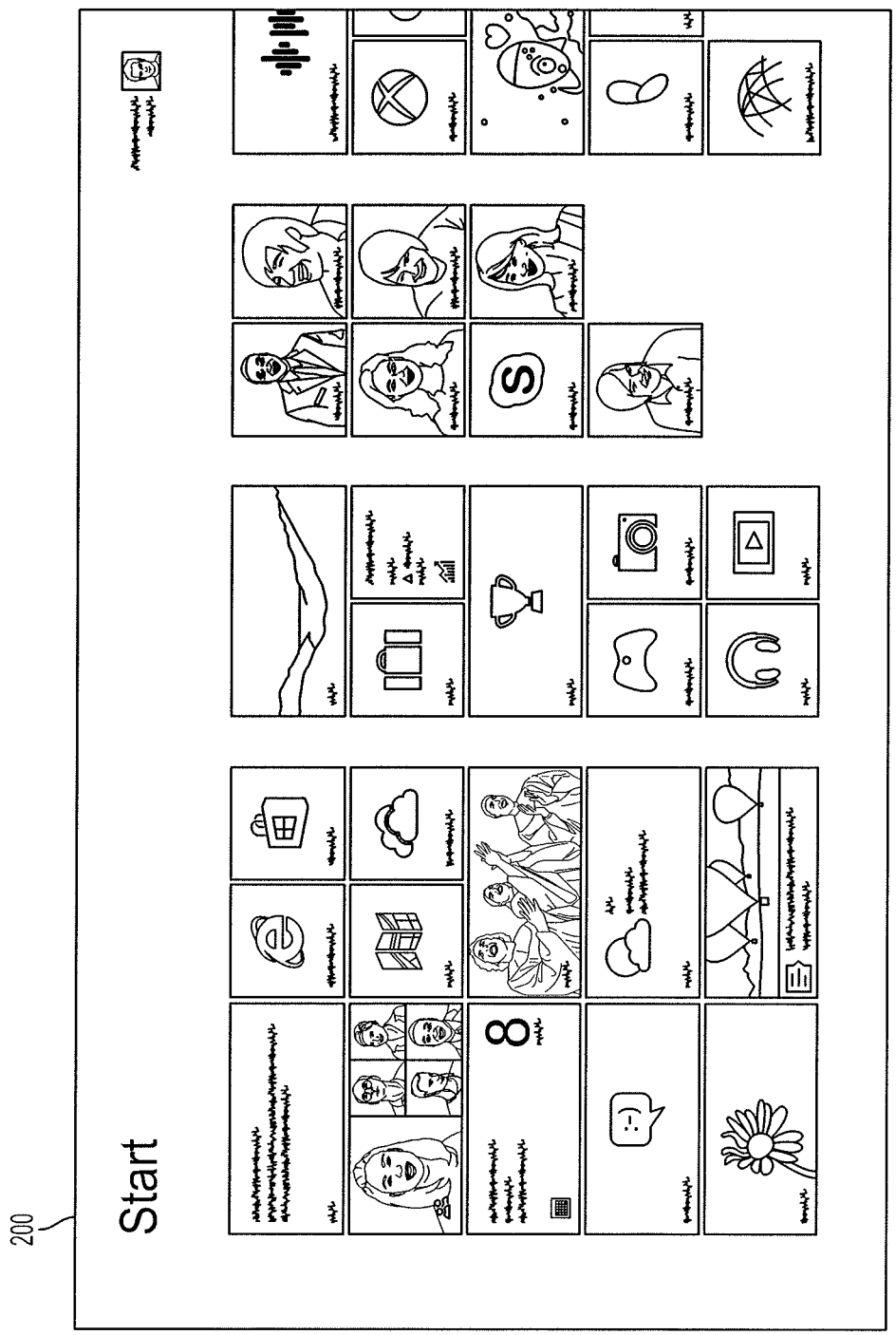
FIG. 2A is a graphical depiction of a display as rendered or presented on the display device of FIG. 1 according to certain embodiments.

FIG. 2A is a graphical depiction of a display 200 as rendered or presented on a display device 104 according to certain embodiments. While presented with reference to the particular operating system shown in FIG. 2A, the embodiments and disclosure herein can be easily adapted to other operating systems (e.g., Microsoft Windows®, Apple iOS®, or Google Android®) and computer programs to perform various functions thereof. The operating system of FIG. 2A includes various computer functionality available through contact-required inputs 108 (e.g., touchscreen taps and gestures). Table 1, below, describes several of these functions and examples of associated contact-required actions to perform each function.

TABLE 1

| Computer Function | Example of Associated Contact-required Action |
|---|---|
| Open Start Menu/Start Screen | Swipe in from the right edge of the display 200 and tap a "Start" button that appears. |
| Open Apps List | Swipe up from the center of the Start screen |
| Previous App | Swipe in from the left edge of the display 200 |
| Display Charms | Swipe in from the right edge of the display 200 |
| Open App Bar | Swipe in from the top or bottom edge of the display 200 |
| Move App Bar | Tap and drag the app bar |
| Hide App Bar | Tap and hold and swipe down the app bar |
| Split Window | Tap and drag the app from the top edge of the display 200 towards the middle of the display 200, and then towards either the left or right edge of the display 200. |
| Close App | Tap and drag the app from the top edge of the display 200 to the bottom of the display 200 |

In order to accommodate performing these and other computer functions without relying solely on contact-required actions, a computer 100 can use detected non-contact actions (e.g., movement of gaze and fixation on target) as instruction to perform various computer functions. The computer can perform a computer function instigated by a non-contact action by either performing the computer function directly (e.g., opening the apps list) or by emulating the contact-required action associated with the computer function (e.g., emulating a swipe up from the center of the Start screen).

Figure 2B:
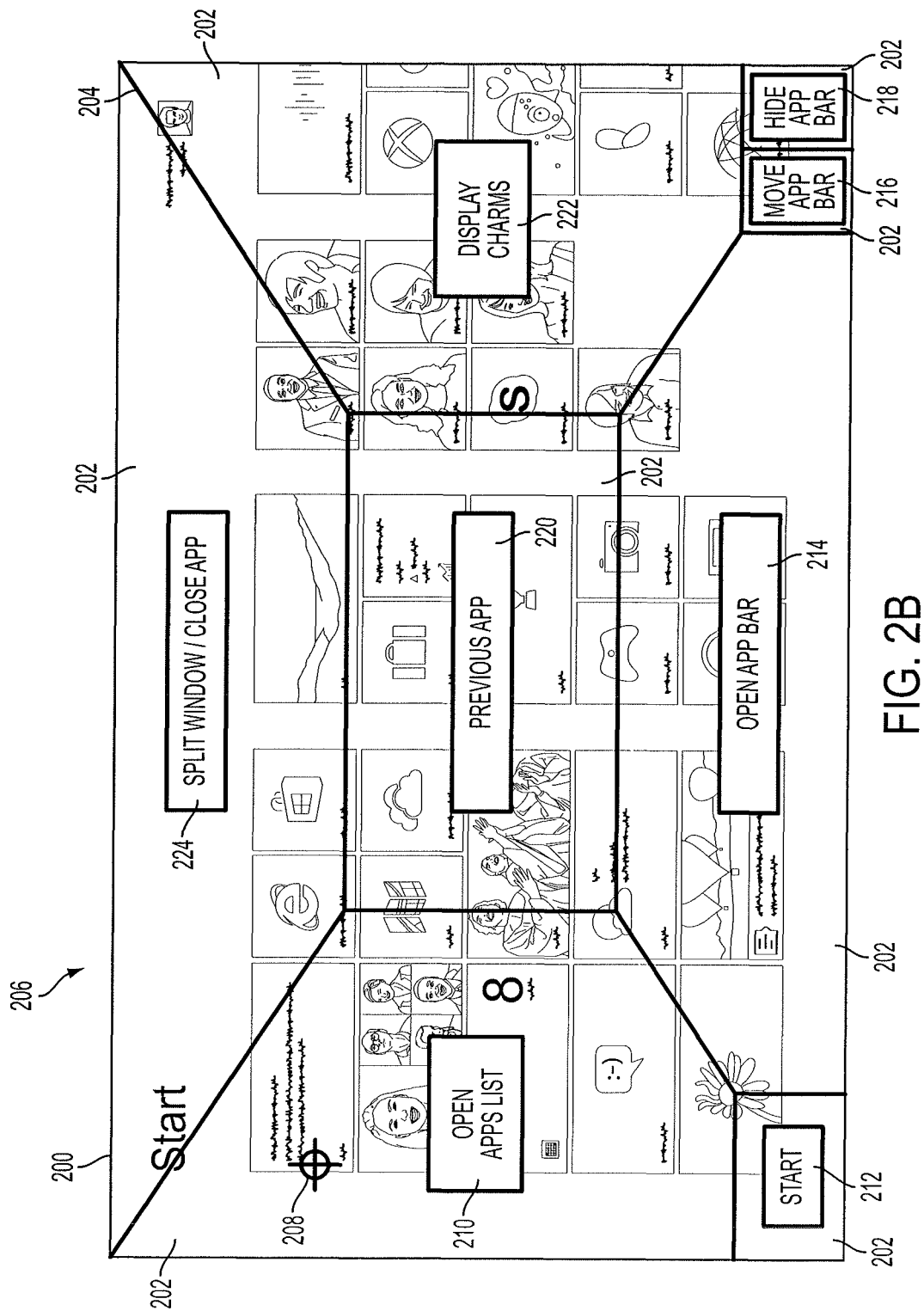
FIG. 2B is a graphical depiction of the display of FIG. 2A in zonal control mode with a first configuration according to certain embodiments.

FIG. 2B is a graphical depiction of the display 200 of FIG. 2A in zonal control mode 206 according to certain embodiments. The display 200 is separated into a first configuration 204 of eight zones 202, however any number of zones 202 and any different configuration can be used. The zones 202 and/or lines between the zones 202 can, but need not, be presented to the user on the display device 104 (e.g., highlighting of a zone 202 or lines separating the zones 202). Zones 202 are used to enable non-contact control of the computer 100. Each zone 202 can be associated with a particular computer function. In some embodiments, the zones 202 are divided and/or located such that a "dead zone" of no functionality exists between some or all of the zones 202, so ensure that measurement errors and/or data noise do not cause undesired effects. In some embodiments, hysteresis can be used to avoid inadvertently selecting an undesired function (e.g., by increasing the boundaries of a zone 202 while the gaze target is in the zone 202 or by introducing a certain amount of delay when the gaze target moves out of a particular zone 202, before altering any performed function).

The computer function associated with each zone 202 can, but need not, be presented to the user on the display device 104 (e.g., a text box). The computer 100 can include a non-contact input 106 that is an eye-tracking device. An eye-tracking device can detect eye indications of a user. As used herein, the term "eye indications" is inclusive of detecting the direction of a user's gaze, detecting changes in the direction of a user's gaze (e.g., eye movement), detecting blinking of one or both eyes, and detecting other information from a user's eye or eyes. A non-contact target 208 is a computed location of where a user's non-contact action is directed. The non-contact target 208 can be graphically represented on the display, such as by a symbol shown in FIG. 2. In the example of an eye-tracking device, the non-contact target 208 is a gaze target, or the point where the user's gaze is directed. The non-contact target 208 can be indicated by 3-D gestures, facial orientation, or other non-contact actions. The non-contact target 208 can, but need not, be depicted in some fashion on the display 200 (e.g., presenting a symbol at the non-contact target or highlighting elements or zones at or near the non-contact target).

In some embodiments, a zone 202 can be located outside of the display 200 and the non-contact target 208 need not be constrained to the display 200 of the computer 100. For example, a zone 202 can be located a distance to the left of a display device 104 and can be associated with a certain computer function. The user can perform the function in that zone 202, as described in further detail below, by focusing gaze to the left of the display device 104. Determination of a zone 202 outside of the display 200 can occur via an imaging device forming part of an eye tracking device or a separate imaging device. If a user's gaze is determined to be directed towards an area outside of the display 200, the direction of the gaze can be determined as herein described and if the gaze target falls within the bounds of a zone 202 outside of the display 200, an appropriate function can be performed as further described herein.

In some embodiments, statistical analysis can be applied to the detected gaze target and/or detected movements of the gaze target in order to determine whether the gaze target is in a particular zone 202.

In some embodiments, a lockout time can be implemented whereby if a user activates a function associated with a zone 202, the function associated with the zone 202 cannot be activated (e.g., activated in the same manner or in a different manner) until the expiration of a certain length of time. In some embodiments, after a user activates a function associated with a zone 202, the size of the zone 202 decreases for a period of time such that a more deliberate gaze by the user is required to activate the function associated with that particular zone 202 again.

Figure 3:
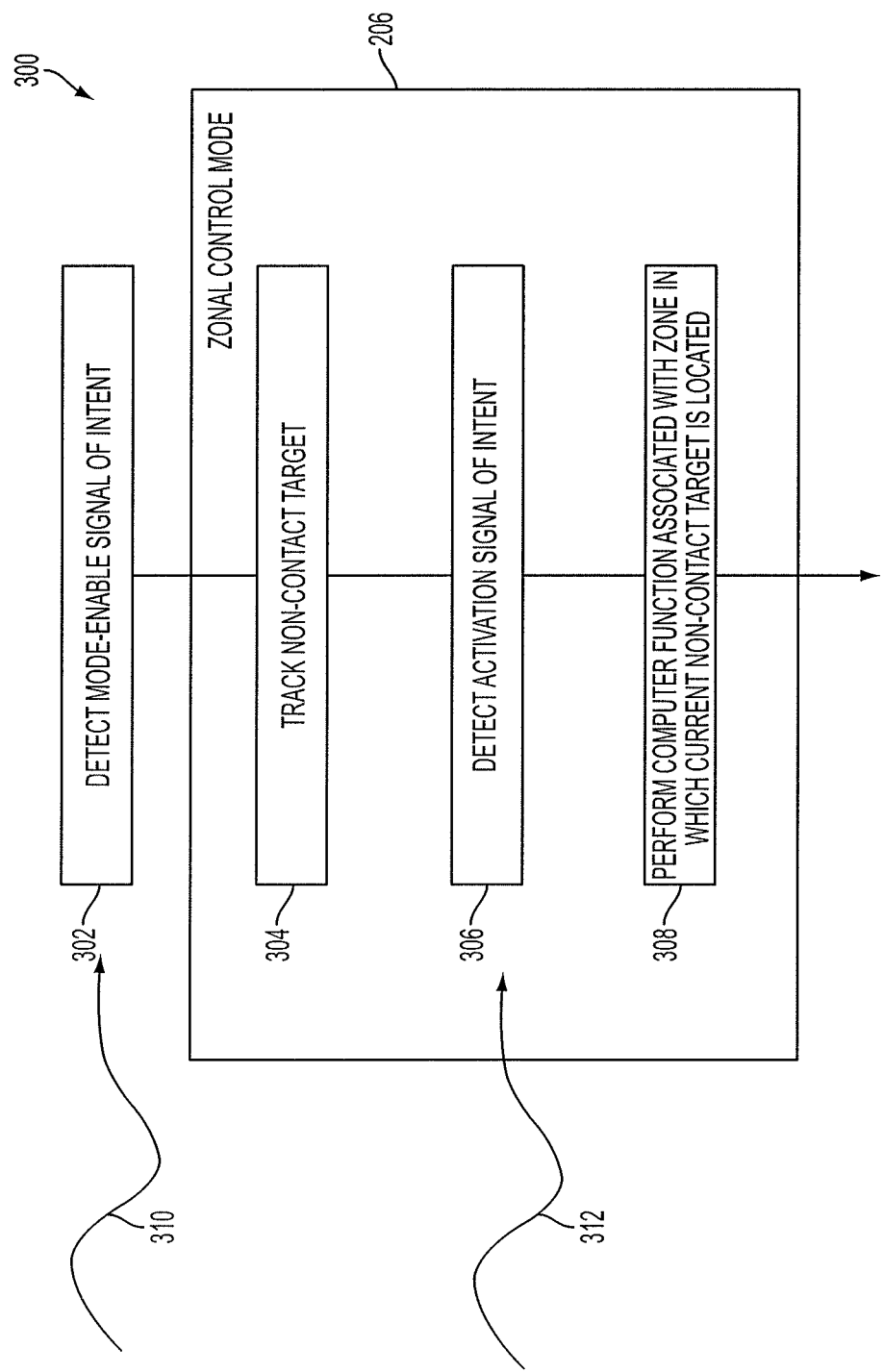
FIG. 3 is a flow chart depicting a process for zonal control according to certain embodiments.

FIG. 3 is a flow chart depicting a process 300 for zonal control according to certain embodiments. With reference to FIGS. 2B and 3, one embodiment of zonal control is discussed below.

The user can generate a mode-enable signal of intent 310. The mode-enable signal of intent 310 can be generated by the user performing a non-contact action or a contact-required action. The computer 100 detects the mode-enable signal of intent 310 at block 302 and enters a zonal control mode 206. During zone control mode 206, the computer 100 tracks the non-contact target 208 at block 304. When the computer 100 detects an activation signal of intent 312 at block 306, the computer 100, at block 308, then performs a computer function associated with the zone 202 in which the non-contact target 208 is located at the time of the activation signal of intent 312. The activation signal of intent 312 can, but need not, be the same type of signal of intent as the mode-enable signal of intent 310. Examples of signals of intent include contact-required actions and non-contact actions. In some embodiments, the computer 100 is always in a zonal control mode 206 (i.e., no separate mode-enable signal of intent 310 is necessary), whereupon receiving an activation signal of intent 312, the computer 100 will perform the function associated with the zone 202 in which the non-contact target 208 is located at the time of the activation signal of intent 312. The computer 100 can, but need not, provide visual feedback that an activation signal of intent 312 was received, that the non-contact target 208 was in a particular zone 202, and/or that a particular function was activated.

In a first example, a user can speak out loud "zone mode" (i.e., perform a non-contact action) to generate the mode-enable signal of intent 310. Upon detecting this mode-enable signal of intent 310, the computer 100 enters zonal control mode 206. The user can then focus gaze somewhere in the zone 202 associated with the computer function Open Apps List 210. The user can dwell gaze (i.e., perform a non-contact action) over the zone 202 associated with the computer function Open Apps List 210 for a predetermined amount of time (e.g., 3 seconds) to generate an activation signal of intent 312. The computer 100 can detect that the user is dwelling gaze at least by detecting that the non-contact target 208 that is a gaze target dwells at a location (e.g., does not move substantially or moves only as much as expected for a user attempting to look at the same location) for a predetermined amount of time. Upon detecting the activation signal of intent 312, the computer 100 can perform the Open Apps List 210 function (e.g., by directly performing the function or by simulating a touchscreen swipe up from the center of the Start screen). The computer 100 can then exit out of zonal control mode 206.

In a second example, a user can focus gaze somewhere in the zone 202 associated with the computer function Display Charms 222. The user can depress a hardware button (i.e., perform a contact-required action) to generate an activation signal of intent 312. Upon detecting the activation signal of intent 312, the computer 100 can perform the Display Charms 222 function. In this second example, no mode-enable signal of intent 310 is necessary.

Graphical representations of the zones 202 may disappear upon an action by a user, or after a predetermined period of time. In the absence of graphical representations of the zones 202, the zonal control mode 206 still functions as described Some examples of possible computer functions associated with potential zones 202 include Open App Bar 214, Move App Bar 216, Hide App Bar 218, Previous App 220, Split Window/Close App 224, and others.

A signal of intent can be any non-contact action detectable by the computer 100. A signal of intent can be any contact-required action detectable by the computer 100. In some embodiments, a signal of intent can be selection and/or activation of an icon in an input menu.

Figure 4:
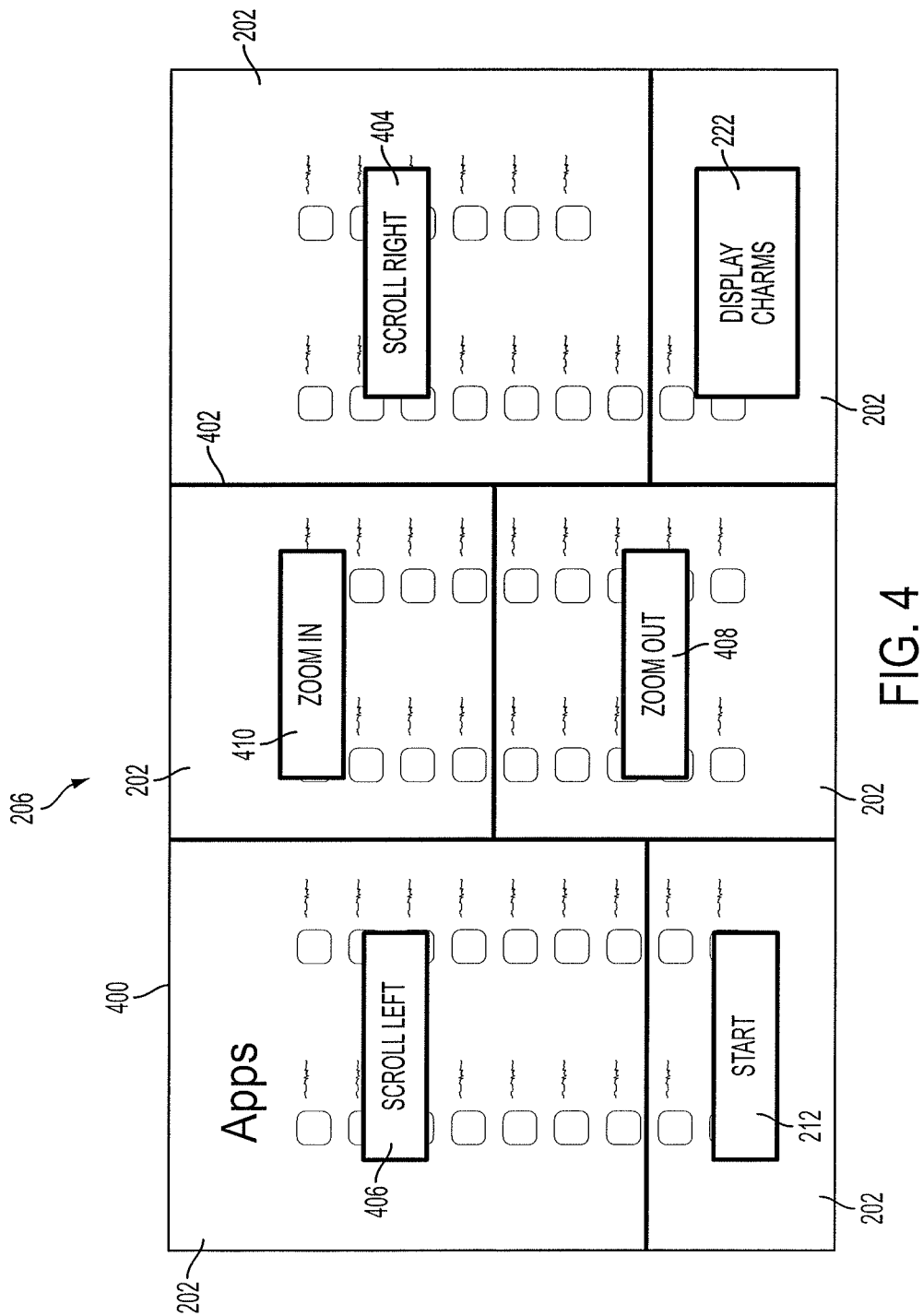
FIG. 4 is a graphical depiction of a display as rendered or presented on the display device of FIG. 1 while in zonal control mode with a second configuration according to certain embodiments.

In some embodiments, the shape of the zones 202 and computer functions associated with each zone 202 can change depending on the state of the computer 100. For example, upon using zonal control to perform the computer function Open Apps List 210, the new window that appears can include different zones 202 with different computer functions associated therewith. FIG. 4 is a graphical depiction of a display 400 as rendered or presented on the display device 104 of FIG. 1 while in zonal control mode 206 with a second configuration 402 according to certain embodiments. The display 200 is separated into a second configuration 402 of zones 202. The second configuration 402 of zones 202 can be associated with the state of the computer 100 after the Open Apps List 210 function has been performed. In this configuration, there are zones 202 associated with various computer functions, including start 212, display charms 222, scroll right 404, scroll left 406, zoom out 408, and zoom in 410. The second configuration 402 need not be dependent on a new screen being displayed on the display 200, but can be associated with any state of the computer 100. For example, the zoom in 410 and scroll left 406 zones 202 may not be a part of the second configuration 402 until needed (e.g., a zoom out 408 or scroll right 404 function has been performed, respectively). The zones 202 in the second configuration 402 can otherwise perform similarly to the zones 202 of the first configuration 204.

In some embodiments, zones 202 can overlap, such that multiple computer functions are performed simultaneously from activation of the zones 202 when the gaze target is within both zones 202. For example, if the overlapping zones 202 were associated with scrolling functions, such as a scroll up function and a scroll right function, activation of the zones 202 (e.g., by moving a gaze target into the zones) can result in the window scrolling diagonally up and to the right.

Figure 8:
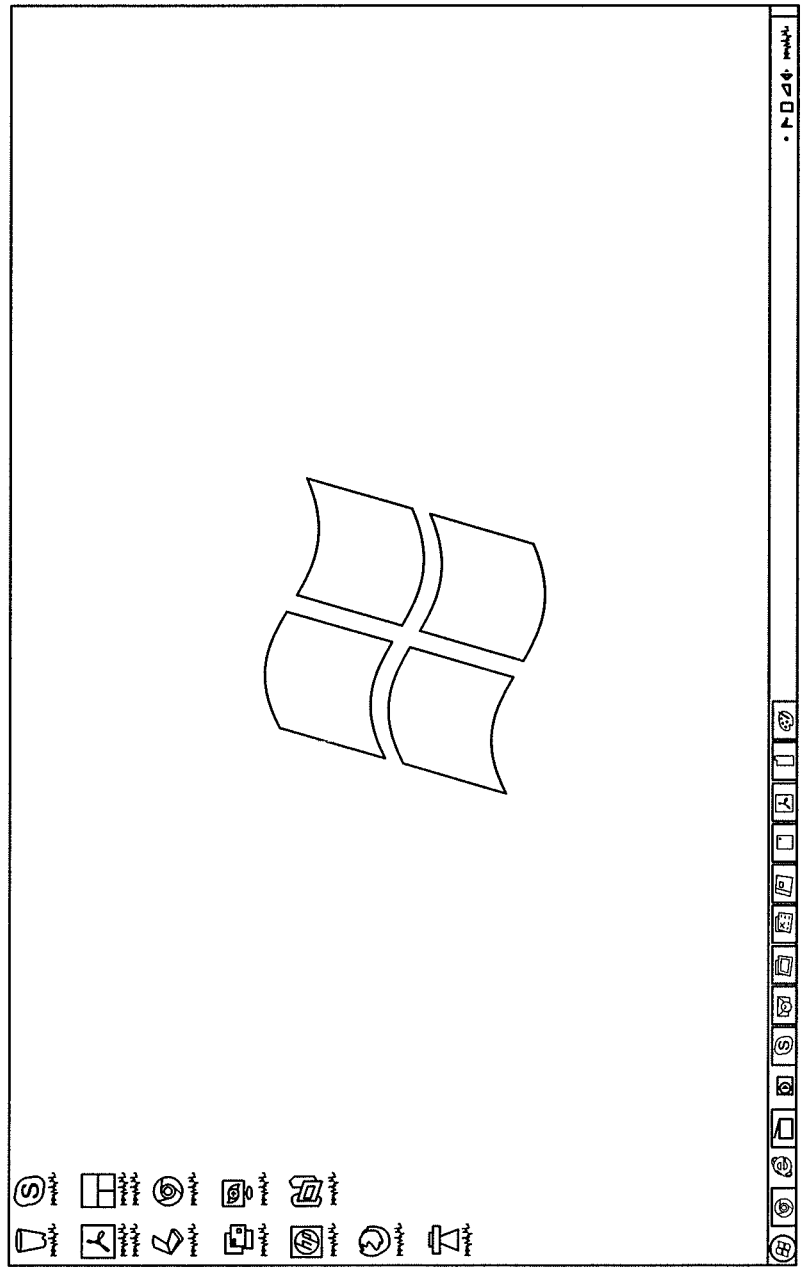
FIG. 8 is a graphical depiction of a display according to certain embodiments.
Figure 9:
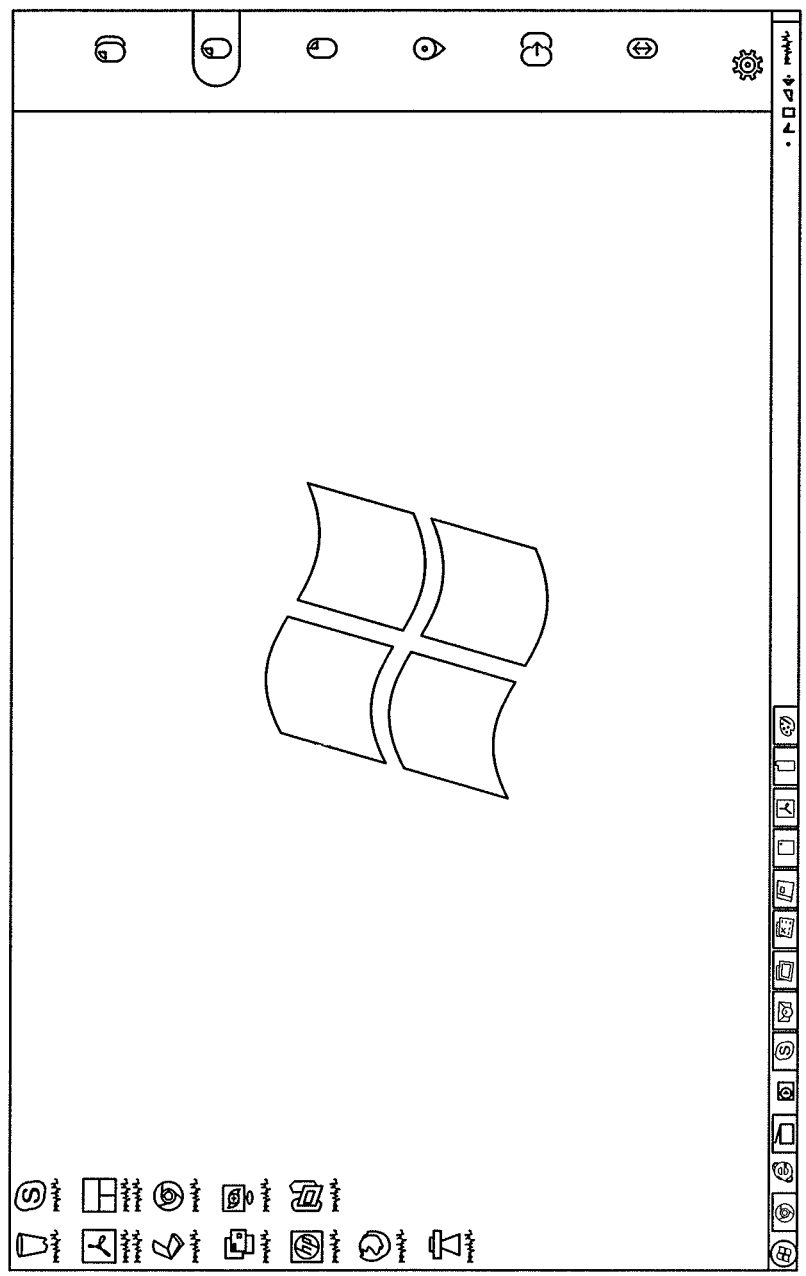
FIG. 9 is a graphical depiction of a display according to certain embodiments.
Figure 11:
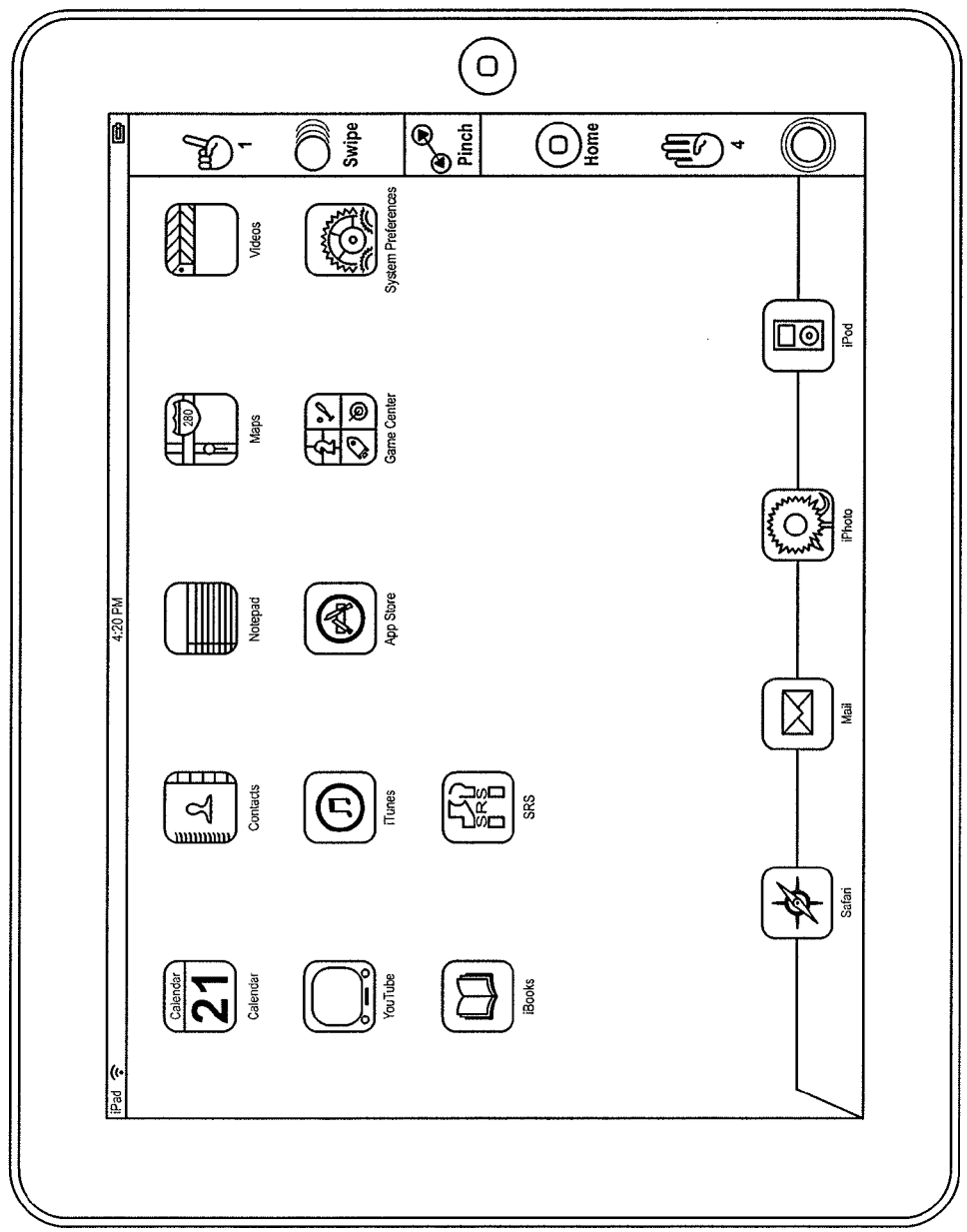
FIG. 11 is a graphical depiction of a display according to certain embodiments.
Figure 12:
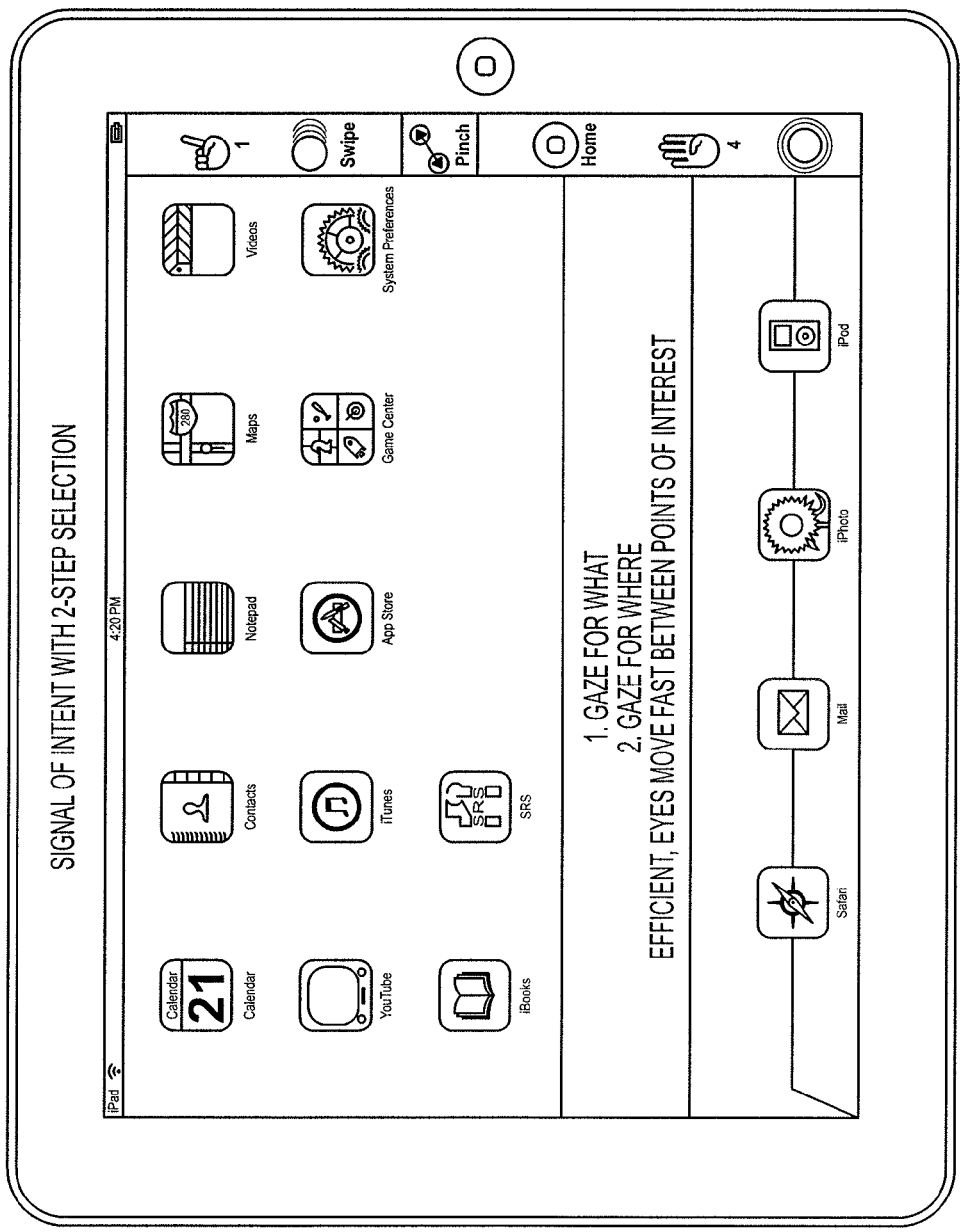
FIG. 12 is a graphical depiction of a display according to certain embodiments.
Figure 13:
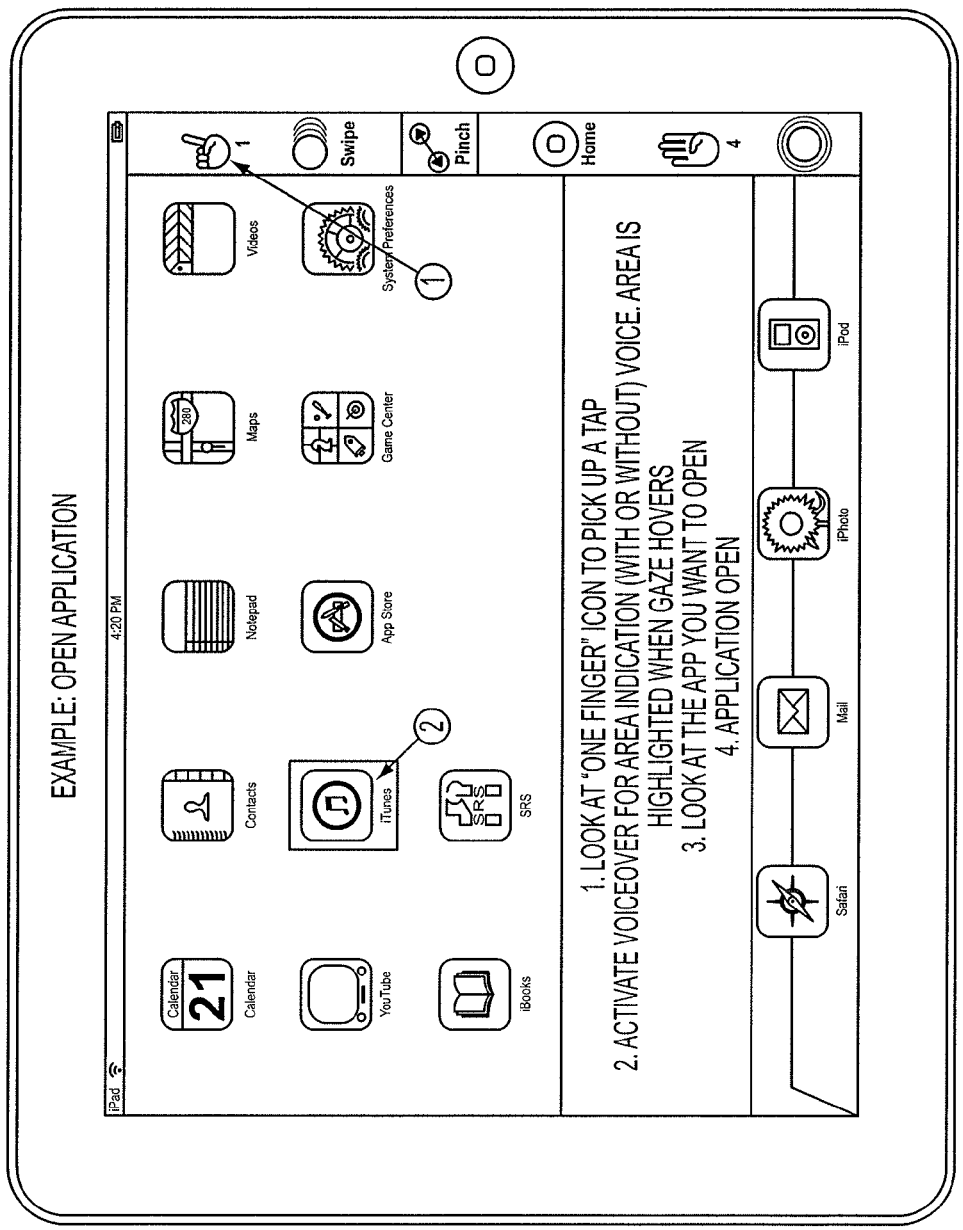
FIG. 13 is a graphical depiction of a display according to certain embodiments.
Figure 14:
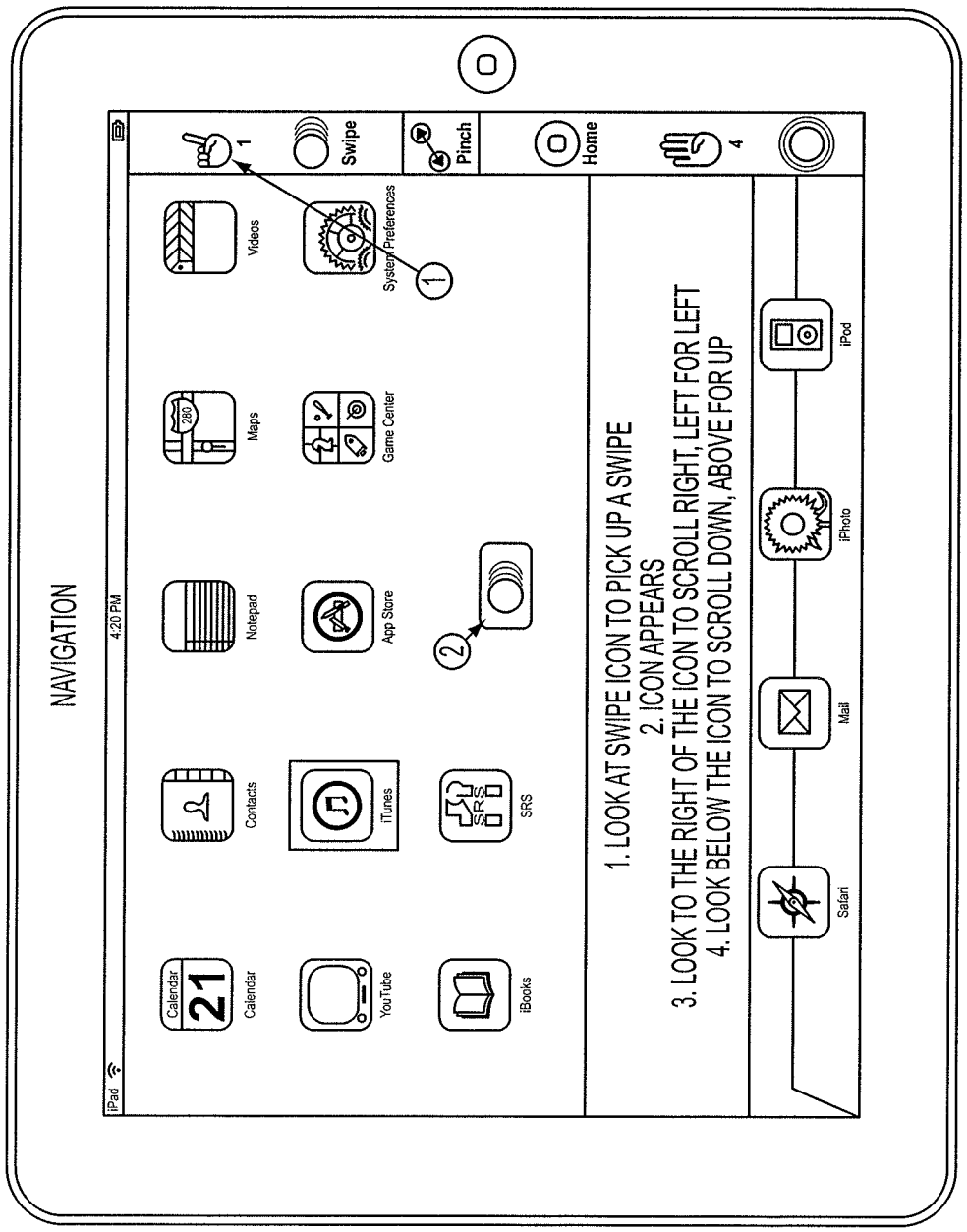
FIG. 14 is a graphical depiction of a display according to certain embodiments.
Figure 15:
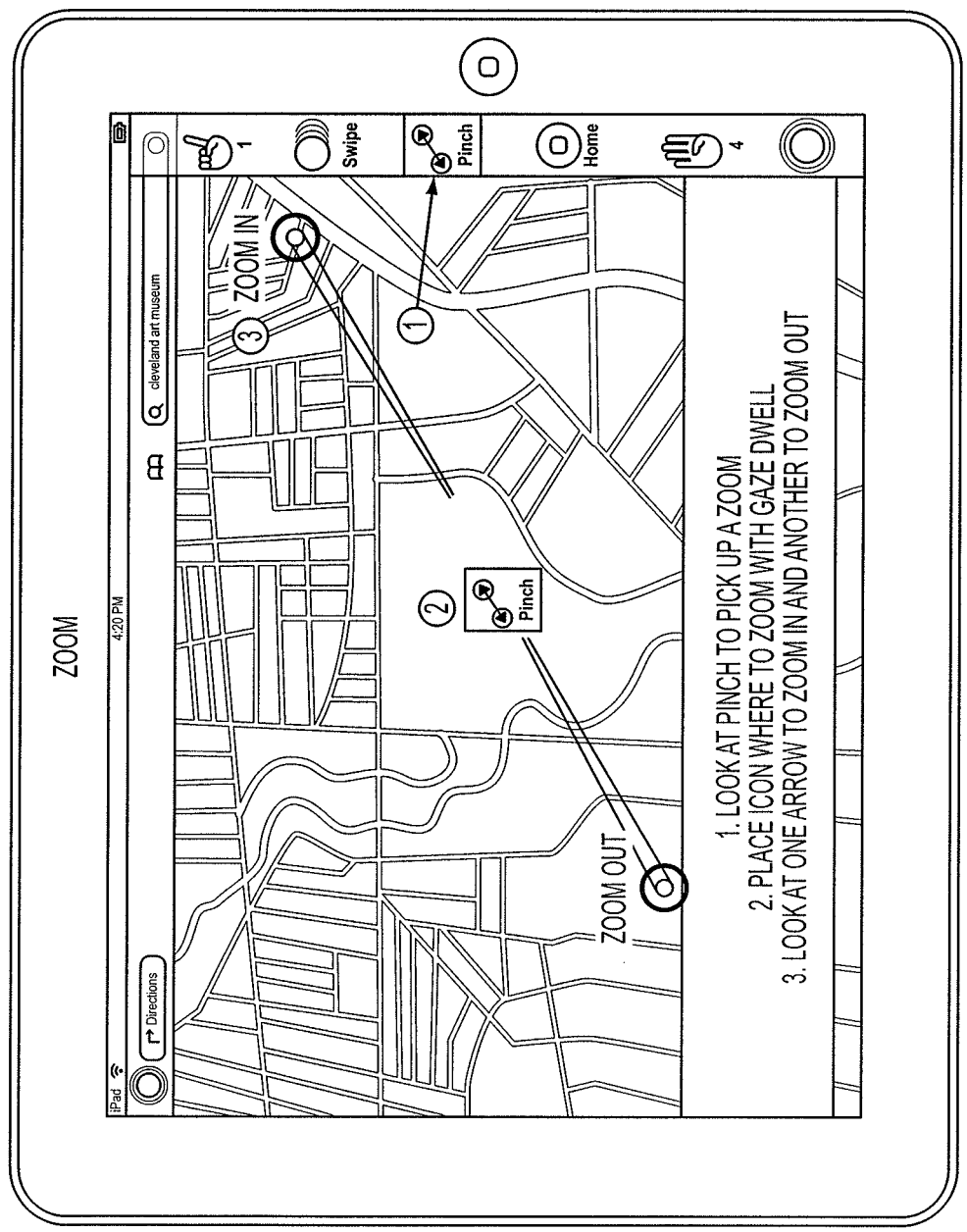
FIG. 15 is a graphical depiction of a display according to certain embodiments.
Figure 16:
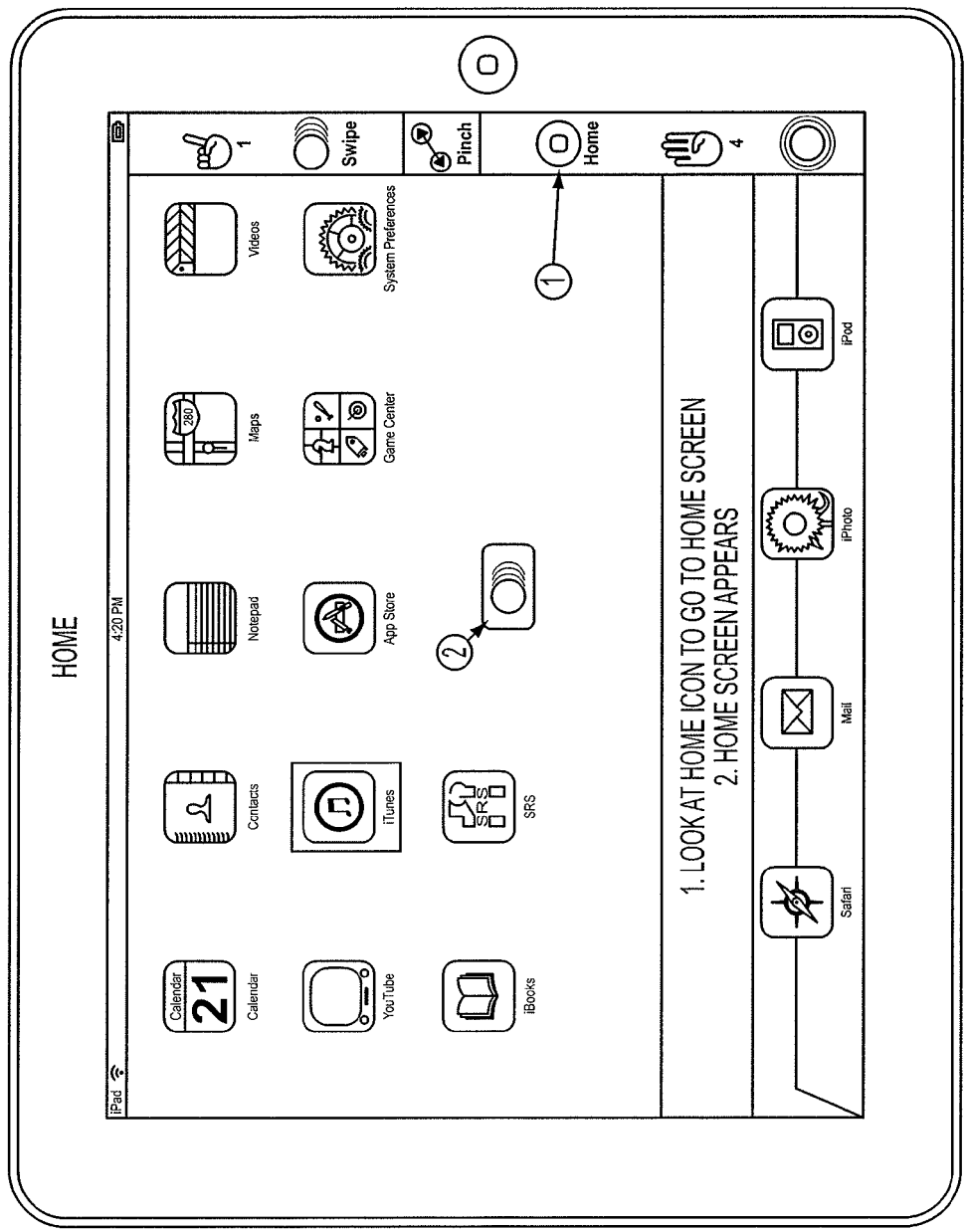
FIG. 16 is a graphical depiction of a display according to certain embodiments.
Figure 17:
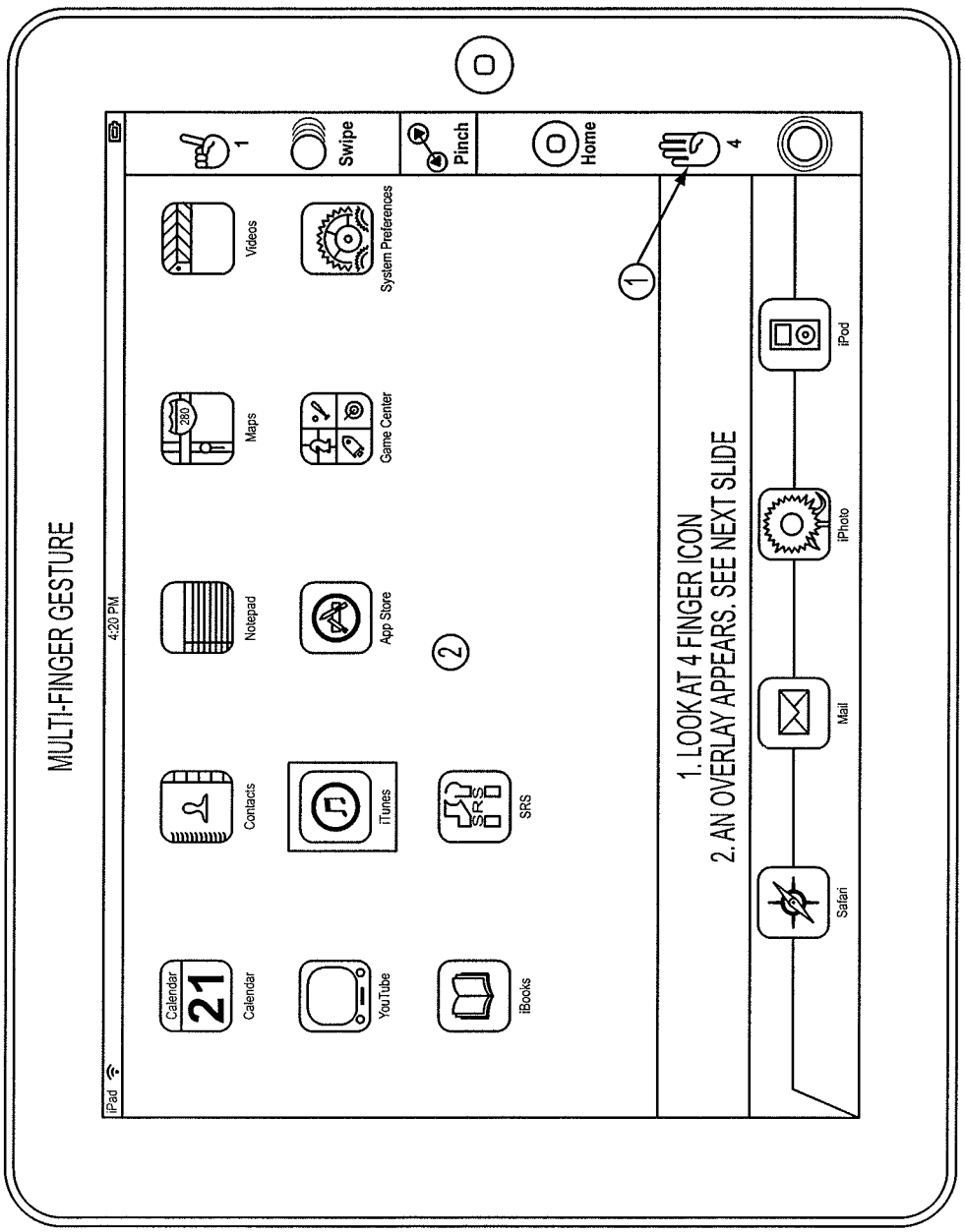
FIG. 17 is a graphical depiction of a display according to certain embodiments.
Figure 18:
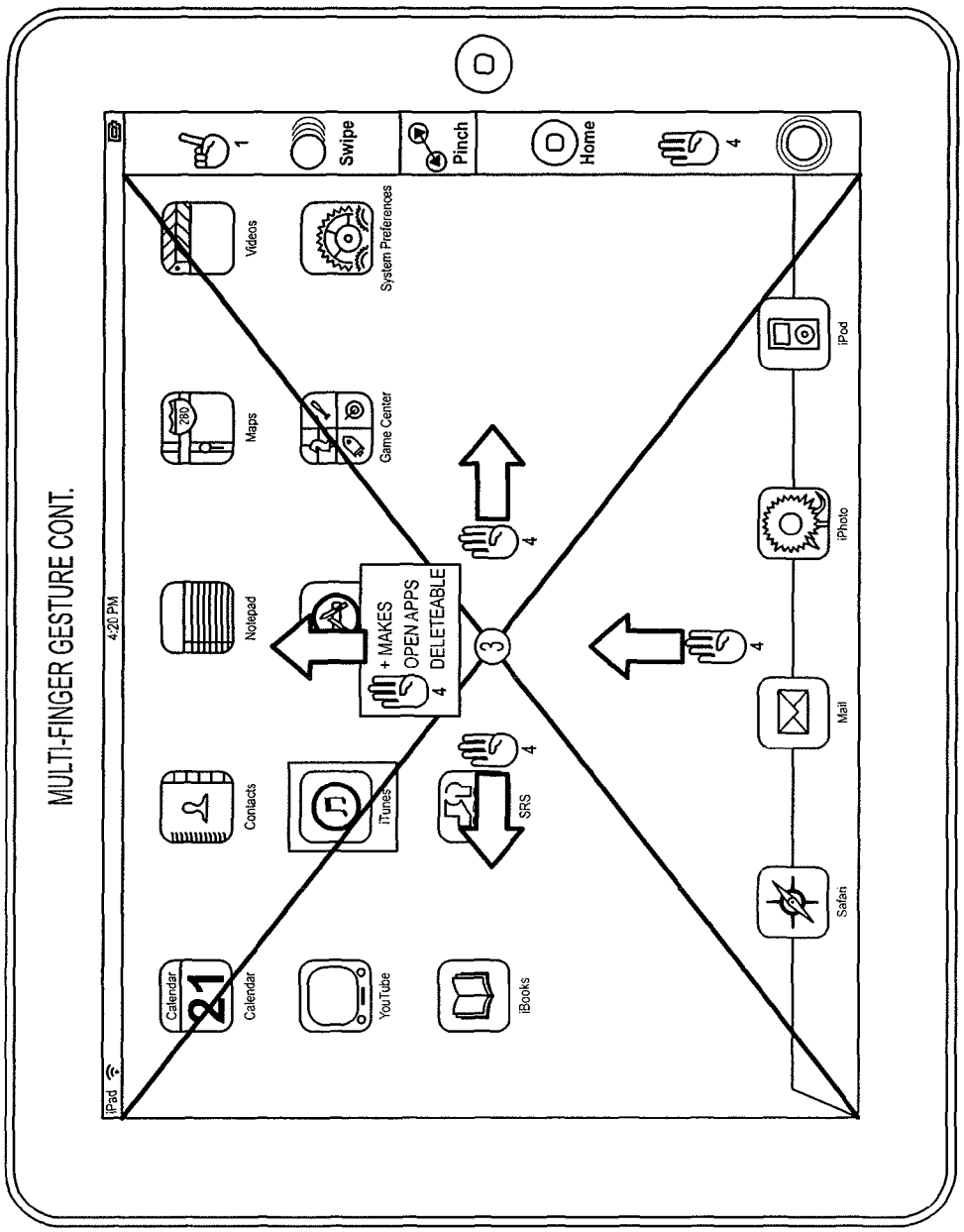
FIG. 18 is a graphical depiction of a display according to certain embodiments.
Figure 19:
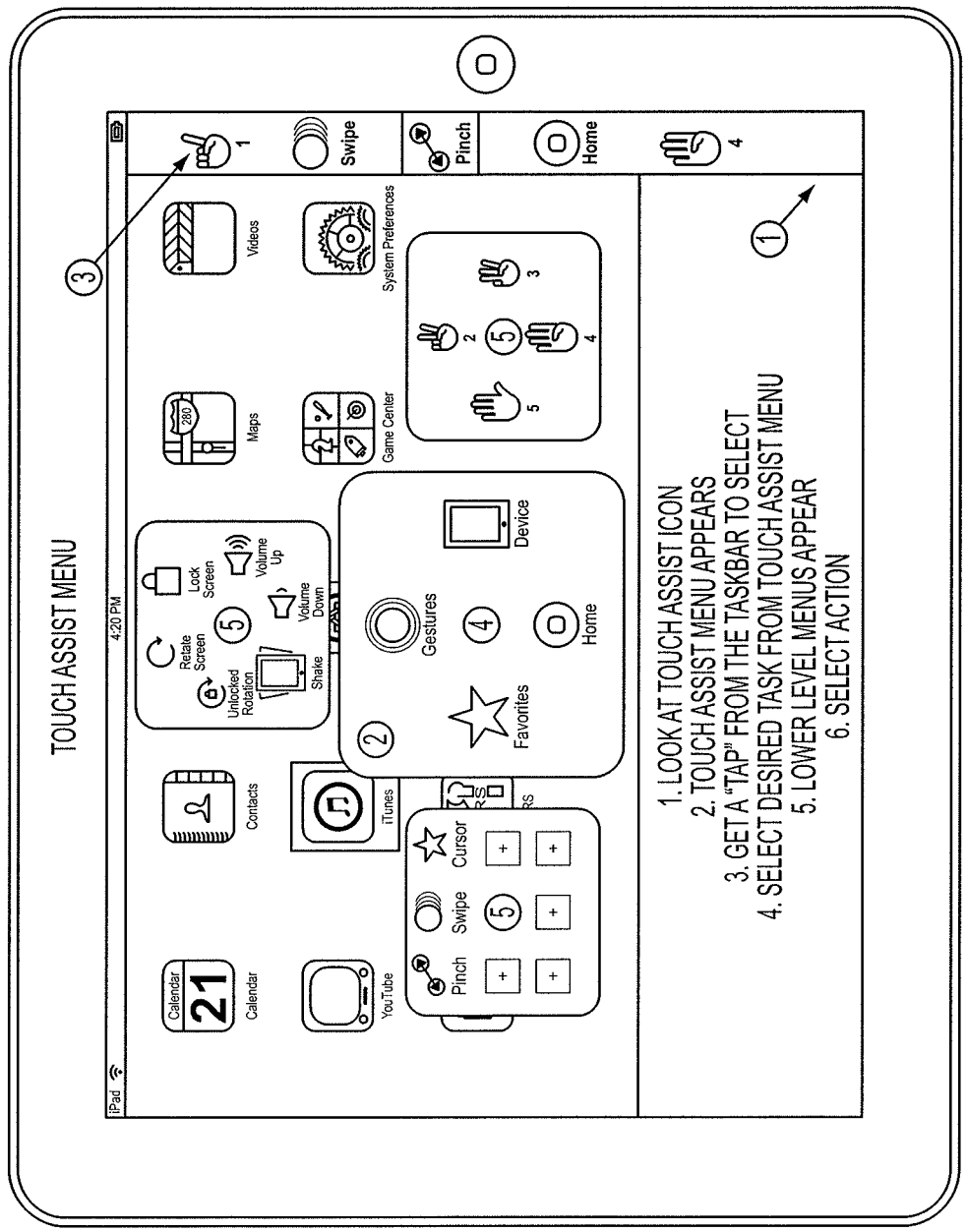
FIG. 19 is a graphical depiction of a display according to certain embodiments.
Figure 20:
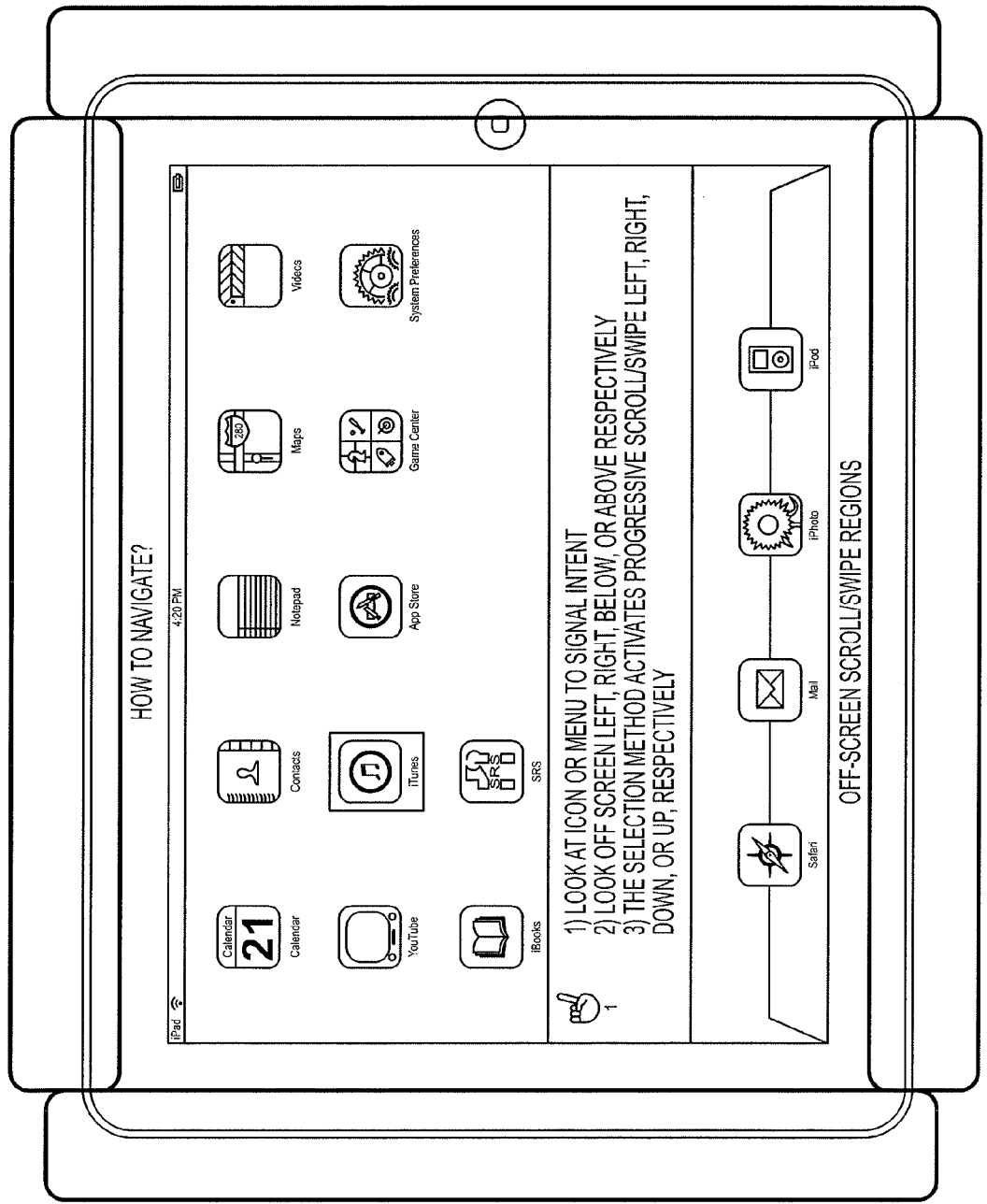
FIG. 20 is a graphical depiction of a display according to certain embodiments.
Figure 21:
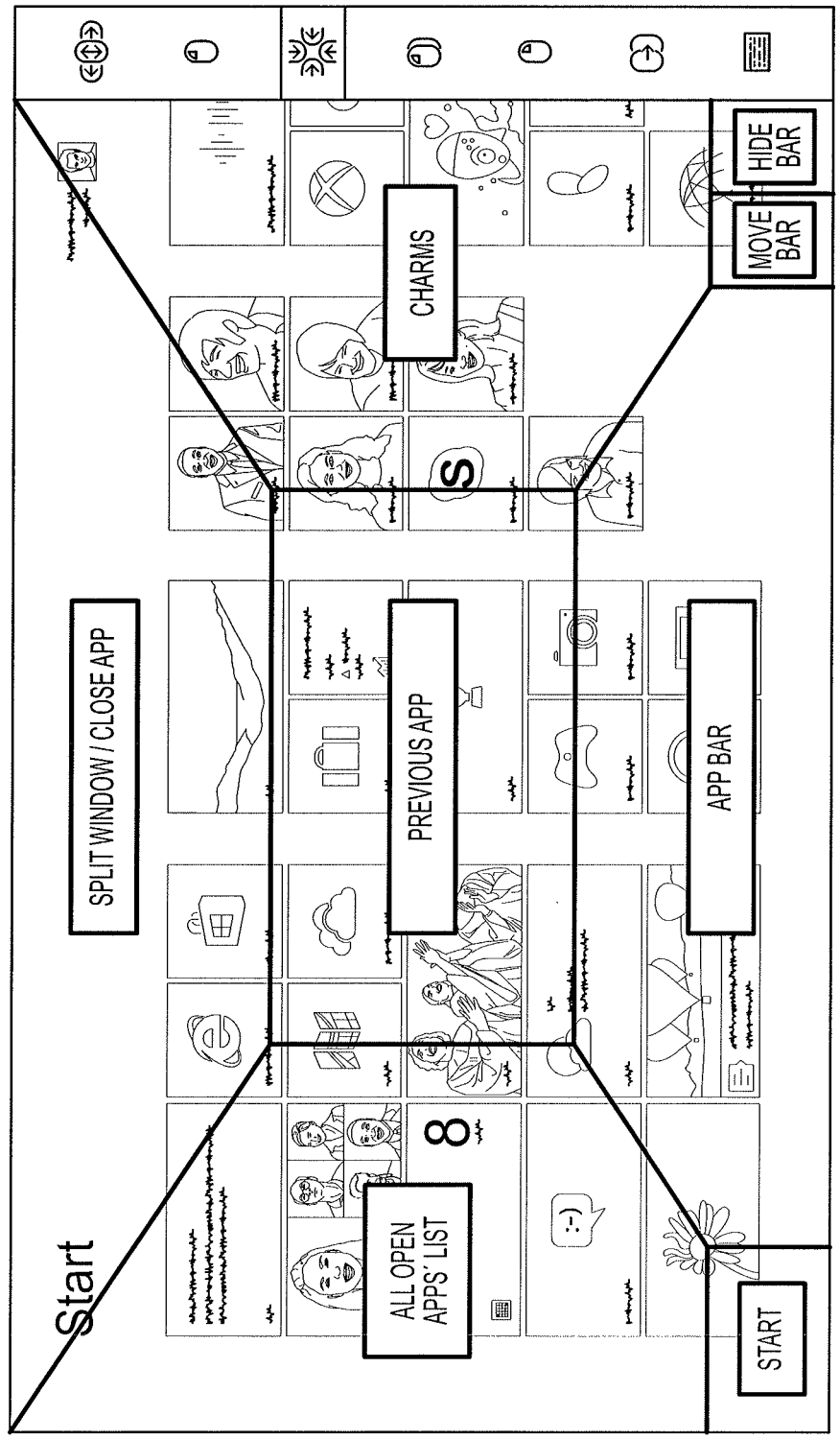
FIG. 21 is a graphical depiction of a display according to certain embodiments.
Figure 22A:
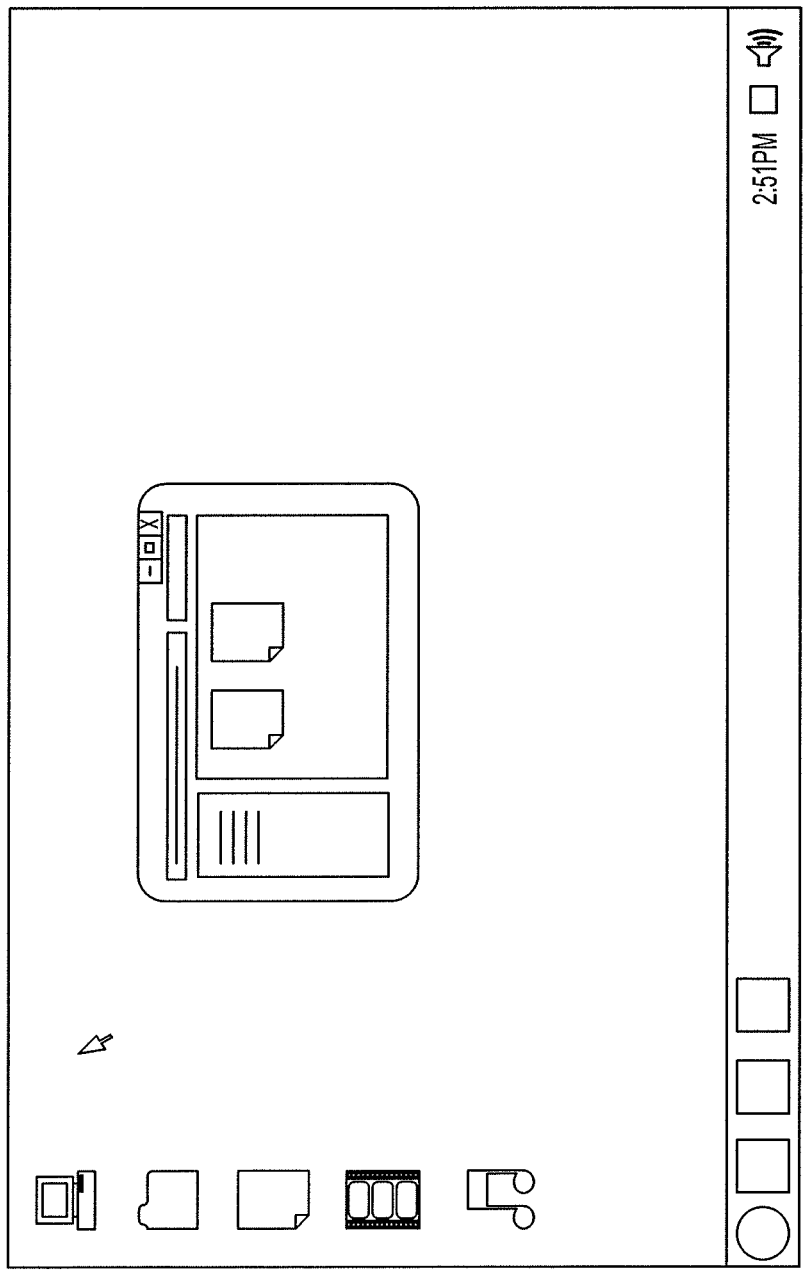
FIG. 22A is a graphical depiction of a display according to certain embodiments.
Figure 22B:
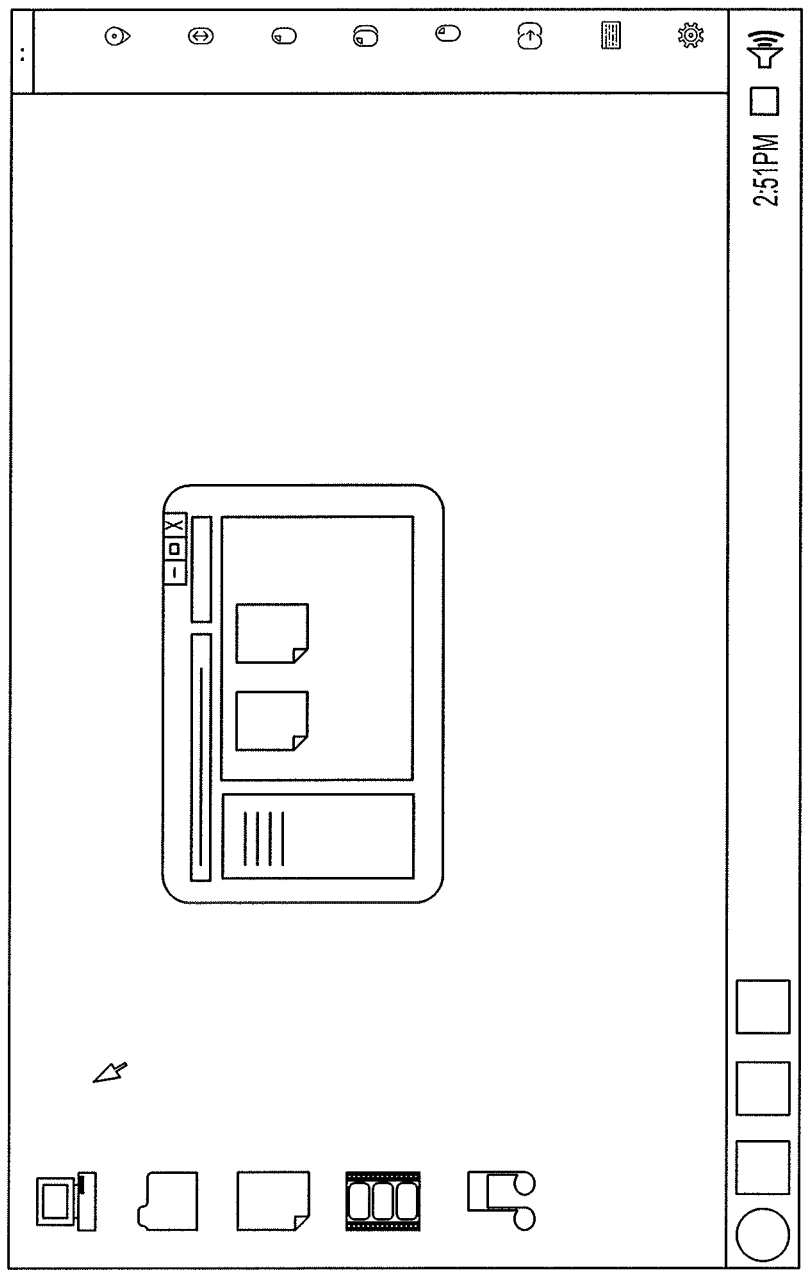
FIG. 22B is a graphical depiction of the display of FIG. 22A showing a menu according to certain embodiments.
Figure 22C:
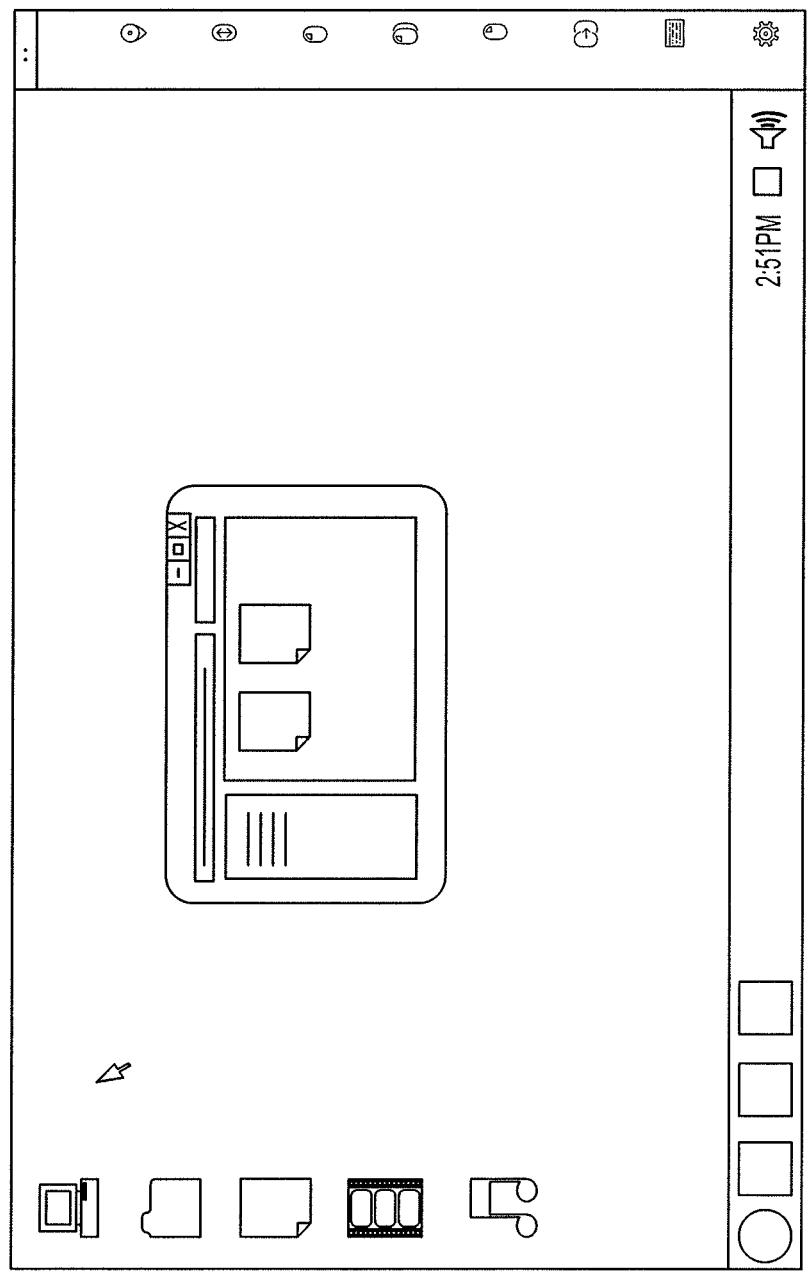
FIG. 22C is a graphical depiction of the display of FIG. 22C showing a menu according to certain embodiments.
Figure 23:
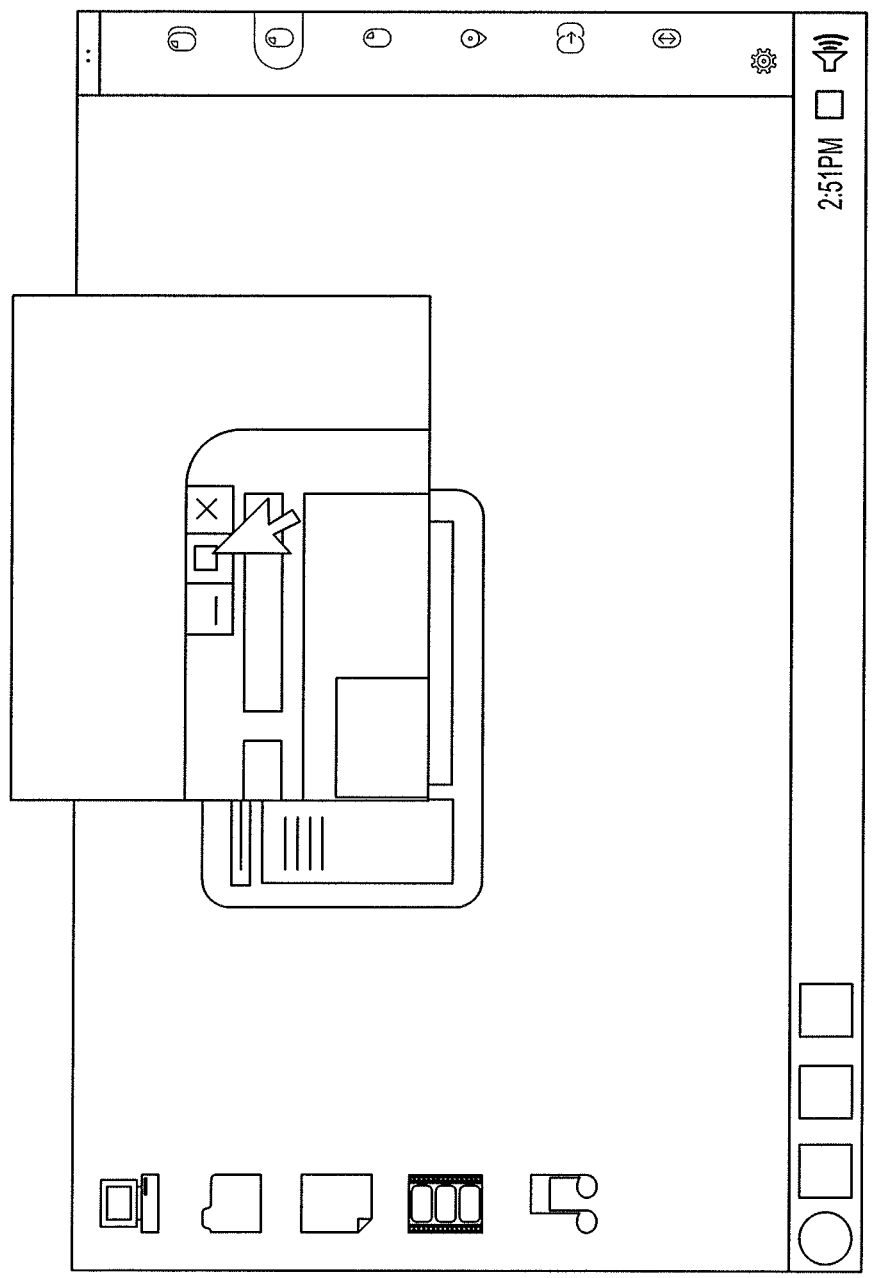
FIG. 23 is a graphical depiction of a display according to certain embodiments.
Figure 24A:
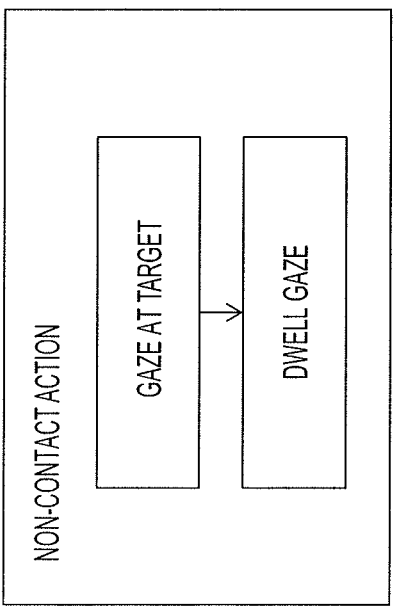
FIG. 24A is a flow chart of a non-contact action according to certain embodiments.
Figure 24B:
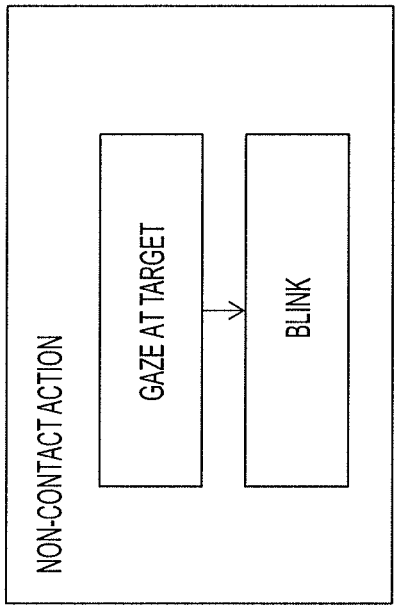
FIG. 24B is a flow chart of a non-contact action according to certain embodiments.
Figure 24C:
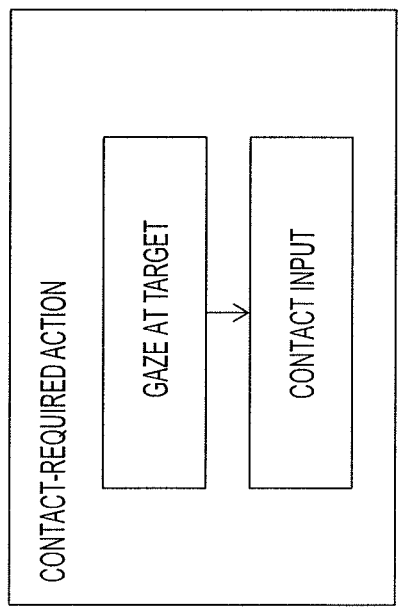
FIG. 24C is a flow chart of a contact-required action according to certain embodiments.
Figure 24D:
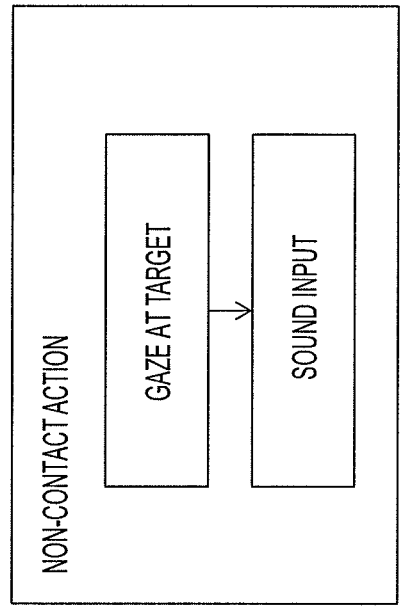
FIG. 24D is a flow chart of a non-contact action according to certain embodiments.

FIGS. 8-10 demonstrate an embodiment whereby a zone is in the form of a menu overlaid atop a computer display. The menu may appear or disappear based on a contact or non-contact input action. The menu comprises options for selection representing computer functions. The options may be selected by gazing at an item and providing an activation signal of intent. By way of example, a user may gaze at an item representing a common computer function known as a "left click", the user may fixate at the item thus providing the activation signal of intent. Once the activation signal of intent has been provided, the computer will perform a "left click" at the next location at which the user fixates or provides another activation signal of intent. In this manner, the user may select the function he or she desires to execute, and then select the location upon the display at which the function is to be executed.

In some embodiments, a user can look at a first zone, then look at a location away from the first zone to perform a computer function associated with the zone in which the non-contact target was located. For example, a user can look at a menu item as described above, initiate an activation signal of intent, then look at an icon, and then initiate a second activation signal of intent. In this example, the computer 100 can determine the function to be performed on the icon based on where the user's gaze was located (i.e., at the zone).

Any function possible on a computer can be performed (e.g., directly performed or emulated) through the use of zonal control as described herein. In the case of computers designed primarily for touchscreen input (e.g., certain mobile computing devices such as mobile phones and tablets), performed functions can include those such as opening an application, navigating the display (e.g., navigating to a new page by swiping a finger across the display), zooming, hardware buttons (e.g., a home button or return button), multi-finger gestures, and others. Some single and multi-finger gestures can include tap, double-tap, long press, press and hold, touch and hold, slide, swipe, drag, press and drag, fling, flick, turn, rotate, scroll, pan, pinch, stretch, edge swipe/bezel swipe, and others. In the case of computers designed for other contact-required input (e.g., desktop computers with a keyboard and mouse), zonal control can be used to perform functions including mouse movement, mouse clicking (e.g., single click, double click, right click, or click and drag), keyboard presses, keyboard combinations, or other functions related to contact-required actions.

Delay Warp

The computer 100 can be controlled through one or both of the non-contact input 106 and the contact-required input 108.

Figure 5:
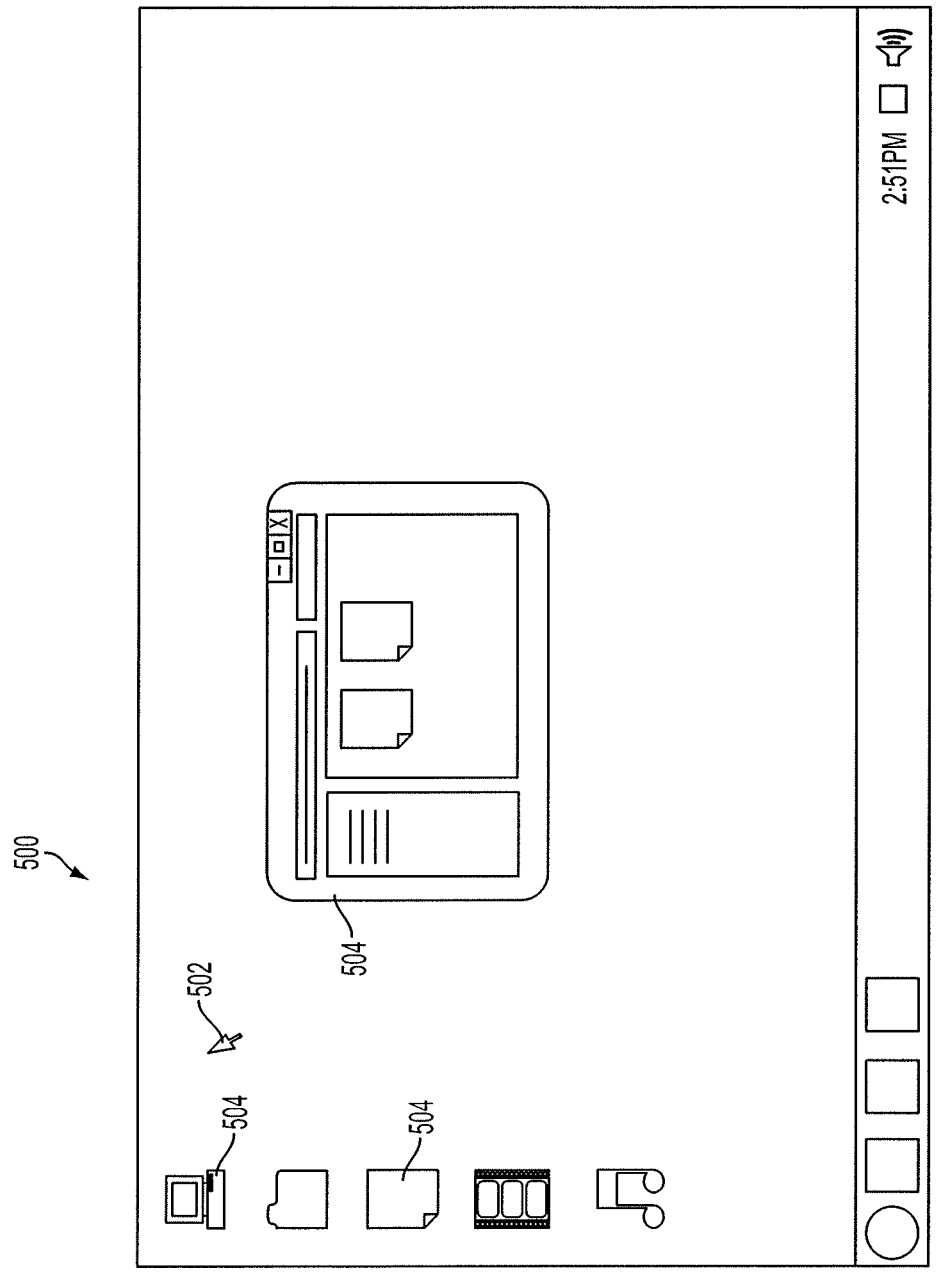
FIG. 5 is a graphical depiction of a display with a visual indicator according to certain embodiments.

FIG. 5 is a graphical depiction of a display 500 with a visual indicator 502 according to certain embodiments. The visual indicator 502 is used like a mouse cursor to help a user perform computer functions (e.g., clicking, dragging, and others). The visual indicator 502 is an indication of where the effect of an additional action (e.g., a mouse click, a touchpad tap, or other contact-required or non-contact action) will occur. The computer 100 can generate a visual indicator 502 on the display at an estimated location of the non-contact target 208, as described above.

In one embodiment, the visual indicator 502 can be displayed at an estimated gaze target of the user. The estimated gaze target is calculated by an eye-tracking device or by a computer 100 using information from an eye-tracking device. The computer 100 contains programming 116 enabling the processor 102 to perform a delay warp, as described below.

Figure 6:
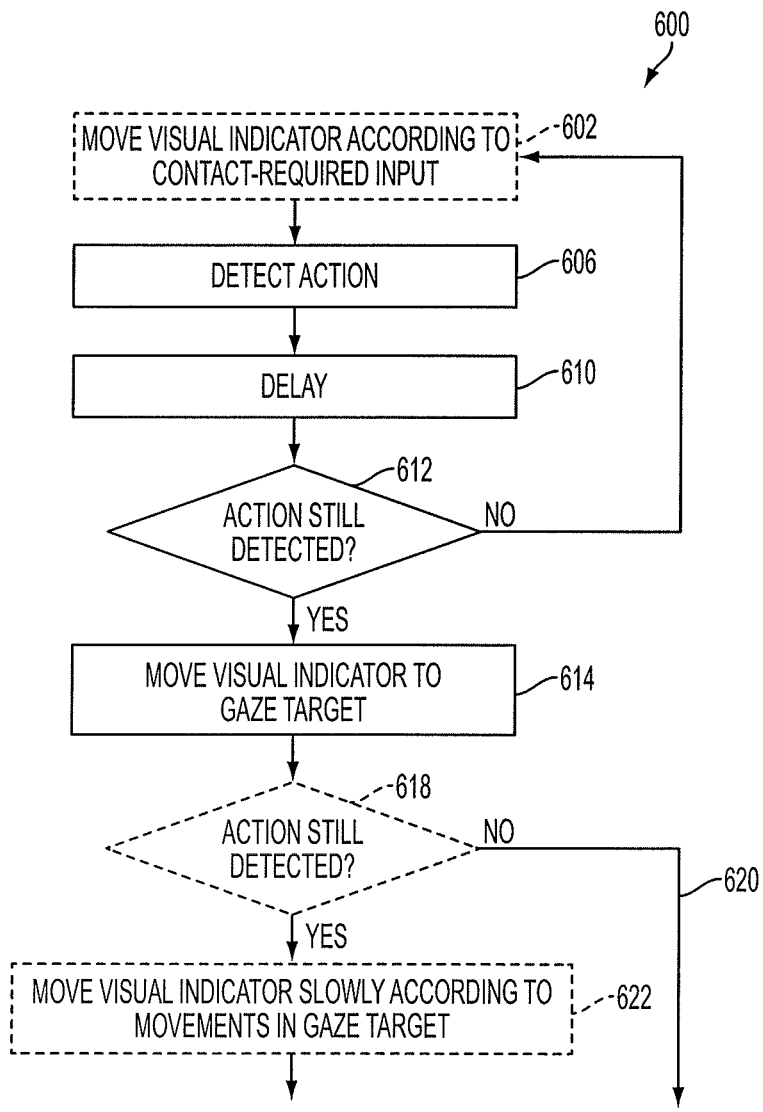
FIG. 6 is a flow chart diagram of delay warp as performed by a computer according to certain embodiments.

FIG. 6 is a flow chart diagram of delay warp 600 as performed by a computer 100 according to certain embodiments. A computer 100 can optionally perform a click according to input from a contact-required input, such as a computer mouse or a touchpad, at block 602. A user can perform an action which is detected at block 606. In one embodiment, upon detecting an action at block 606, the computer 100 can display a visual marker at an estimated gaze target of the user. The visual marker can be an indicator of to where the cursor will move as described herein. For example, the user can perform a contact-required action, such as touching a touch-sensitive device. Upon detecting the action at block 606, the computer 100 can delay, for a predetermined amount of time, at block 610. This delay can be utilized by the computer 100 to provide sufficient time for a user to alter action (e.g., decide not to move the cursor) and for the computer 100 to be certain of the user's intention. At block 612, if the computer 100 still detects the action (e.g., the user continues to touch the touch-sensitive device), the computer 100 can move the visual indicator 502 to the gaze target at block 614. If the action is not still detected, the computer 100 can, at block 602, do nothing, go back to having a contact-required input move the visual indicator 502 (e.g., cursor), or perform a click at or move the visual indicator 502 to its original location.

In an embodiment, the delay warp 600 additionally includes optional block 618 where the computer 100 determines whether the action is still detected (i.e., after the visual indicator 502 has moved to the gaze target). If the action is not still detected, such as if the user is no longer touching the touch-sensitive device, the computer 100 can perform additional functions as necessary (e.g., perform a "click" where the visual indicator 502 was last located, or do nothing) at path 620. However, if the action is still detected at optional block 618, the computer 100 can slowly move (e.g., with more precision) the visual indicator 502 (e.g., a cursor) according to movements of the user's gaze, a computer mouse, or a touchpad at optional block 622.

For example, if a user desires to select an element 504 on a display 500, such as an icon, the user can look at the icon and touch the touchpad for the predetermined period of time, such as 200 ms, after which the computer 100 will move the visual indicator 502 to the icon. If the user, before the predetermined period of time has elapsed, decides not to have the visual indicator 502 moved to the gaze target, the user can cease touching the touchpad.

In an embodiment, the user can touch the touchpad or click a mouse button and wait the predetermined period of time so that the visual indicator 502 moves to the gaze target. Thereafter, the user can continue touching the touchpad or holding the mouse button while moving gaze away from the visual indicator 502 (e.g., above, below, or to the side) in order to move the visual indicator 502 with fine-tune adjustments until the visual indicator 502 is in a desired location, at which point the user can cease touching the touchpad or holding the mouse button in order to perform an action at the desired location (e.g., click an icon).

In some embodiments, the user can touch the touchpad or click a mouse button and wait the predetermined period of time so that the visual indicator 502 moves to the gaze target. Thereafter, the user can continue touching the touchpad or holding the mouse button while moving the cursor with the touchpad or mouse in order to move the visual indicator 502 (e.g., cursor) with fine-tune adjustments until the visual indicator 502 is in a desired location, at which point the user can cease touching the touchpad or holding the mouse button in order to perform an action at the desired location (e.g., click an icon).

A user can look at a desired screen element 504 (e.g., an icon, a window, or other graphical user interface ("GUI") element) in order to direct the visual indicator 502 to that element 504. In order to perform a desired computer function (e.g., a click), the user can perform an additional action (e.g., tap a touchpad).

In some embodiments, the visual indicator 502 may not be regularly displayed, but as the user moves gaze around the display 500, any elements 504 at or adjacent the gaze target can be highlighted or otherwise distinguish the element 504 as at or near the gaze target.

In some embodiments, the use of a visual indicator 502 enables a user to see the effect of non-contact actions on the computer 100 before performing additional actions (e.g., non-contact actions or contact-required actions). When a user intends to move the visual indicator 502 or other graphical element 504 on a display, the user looks at the desired destination of the visual indicator 502. The eye-tracking device calculates an estimated gaze target based on the user's gaze. The user then activates a non-contact input 106 or a contact-required input 108, for example by tapping a touchpad. For a predetermined period of time, for example 200 ms, the computer 100 does not perform a computer function.

During this predetermined time, the visual indicator 502 is shown on the display 500 at the estimated gaze target. This visual indicator 502 or a separate visual marker can then demonstrate to the user the location to which the visual indicator 502 will be moved. If the user determines to proceed, the visual indicator 502 will be moved after a predetermined period of time. The user can indicate a desire to proceed by initiating an action (e.g., a contact-required action such as moving an input device) or by simply waiting for the predetermined period of time to expire.

If the user determines not to proceed, the user may perform a specific action such as removing contact with the input device, tapping the input device or pressing and holding the input device. Typically, these actions cause the computer 100 to perform a specific function, such as tapping to open an icon, dragging such as dragging an item on a GUI, zooming upon an item, or others. Actions that are normally performed with an input device would be readily understood by a person skilled in the art.

If the user is not satisfied with the location of the visual indicator 502, the user can determine that an adjustment is required in order to more accurately reflect the desired movement location of the visual indicator 502. The user can gaze at a different location in order to change the gaze target, or the user can perform a small movement with an input device (e.g., move a computer mouse or move touch on a touchpad) to adjust the location of the visual indicator 502 after the visual indicator 502 has moved to the gaze target.

In this manner, natural interaction with a touchpad accommodates gaze information. If a user places their finger on a touchpad in order to perform a gesture such as a swipe or movement on the touchpad, the movement can override movement of the mouse cursor to the gaze location.

In one embodiment, a computer 100 includes a touchpad as a contact-required input device and an eye tracking device capable of determining a user's gaze target.

The computer 100 utilizes input from both the touchpad and the eye tracking device to allow a user to navigate through user interfaces. Most frequently this is achieved through moving a visual indicator 502 on a display 500.

The computer 100 utilizes gesture type commands used on the touchpad, for example a swipe across the touchpad by a user to move to the next element 504 in a series, or a pinch gesture on the touchpad to zoom a displayed element 504.

According to the present disclosure, when a user contacts the touchpad with a finger or the like, the computer 100 delays performing a computer function for a predetermined period of time. During this period of time, a visual indicator 502 is shown at an estimated gaze target of the user. The estimated gaze target is calculated based on information from the eye tracking device.

After the predetermined period of time expires, the computing system moves the location of the visual indicator 502 on the display 500 to the gaze target. The user can then move the visual indicator 502 by moving their finger on the touchpad.

If the user does not wish for the visual indicator 502 to be moved to the gaze target, the user can perform another action during the predetermined period of time—such as the aforementioned gesture type commands, or simply remove their finger from the touchpad to cancel any action.

In an embodiment, the computer 100 can locate the visual indicator 502 at an element 504 in proximity to the actual gaze target. This element 504 can be a Graphical User Interface (GUI) object, for example, such as a button, text box, menu or the like. The computer 100 can determine which element 504 at which to locate the visual indicator 502 based on a weighting system whereby some elements 504 have predetermined weights higher than other elements 504. For example, a button can have a higher weighting than a text box. The determination of which element 504 at which to place the visual indicator 502 can also consider proximity to the gaze target.

In an embodiment, the computer 100 can provide tactile or audible feedback indicating that a gaze target is able to be determined. In this way, the feedback will indicate to the user whether the system is functioning correctly and if not, it will allow the user to alter their behavior to accommodate the function or non-function of the eye tracking device. This feedback can be in the form of a touchpad providing haptic feedback when an estimated gaze position has been determined during a cursor movement procedure.

Figure 25:
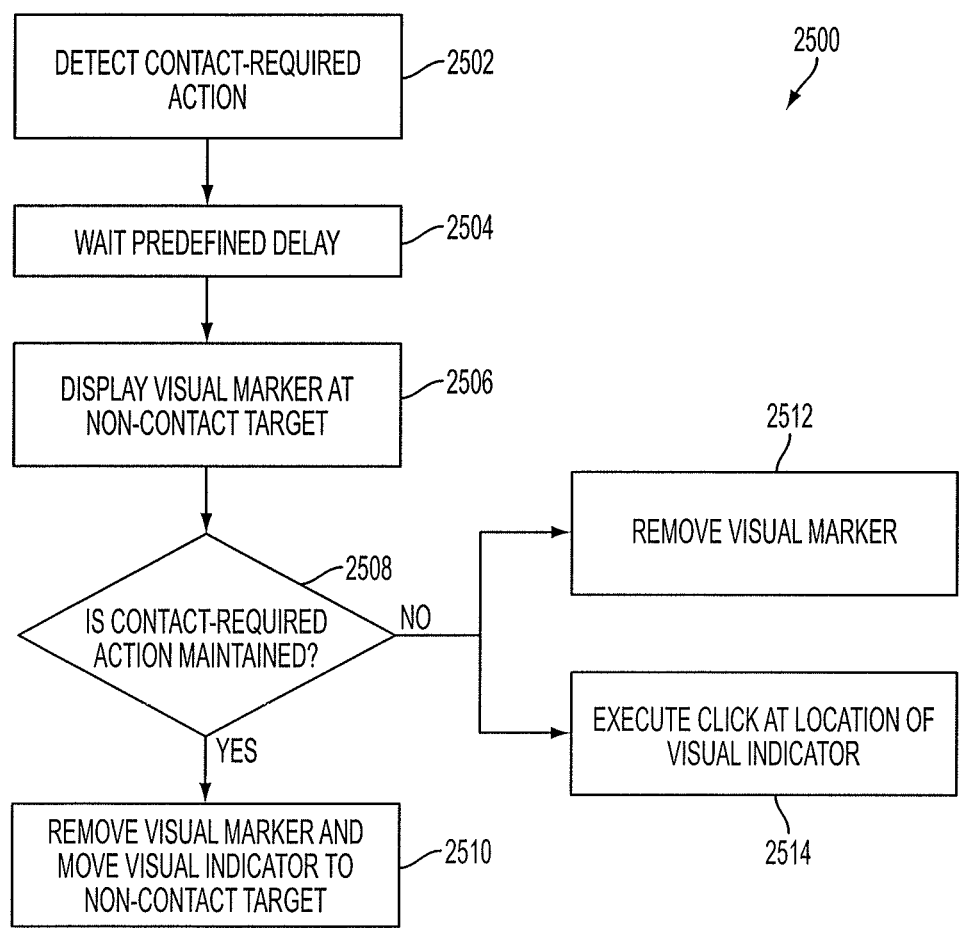
FIG. 25 is a flow chart of a delay warp 2500 with a visual marker according to certain embodiments.

FIG. 25 is a flow chart of a delay warp 2500 with a visual marker according to certain embodiments. The visual marker is an indication of to where the visual indicator (e.g., cursor) might jump or "warp" under certain conditions. At block 2502, a contact-required action is detected, such as a user touching a touchpad. The computer 100 waits for the duration of a predefined length of time (e.g., delay) at block 2504. In some embodiments, the delay can be 0 seconds (i.e., no delay). After the delay, at block 2506, the computer 100 causes a visual marker to be displayed at the non-contact target (e.g., gaze target). In alternate embodiments, an additional delay can be incorporated after block 2506 and before block 2508. At block 2508, the computer 100 determines if the contact-required action is maintained, such as if the user is still touching the touchpad. If the contact-required action is maintained, the computer 100, at block 2510, then ceases to display the visual marker and moves the visual indicator (e.g., cursor) to the non-contact target. If the contact-required action is not maintained at block 2508, the computer 100 can cease displaying the visual marker at block 2512 and execute a click at the location of the visual indicator (e.g., cursor) at block 2514.

Figure 26:
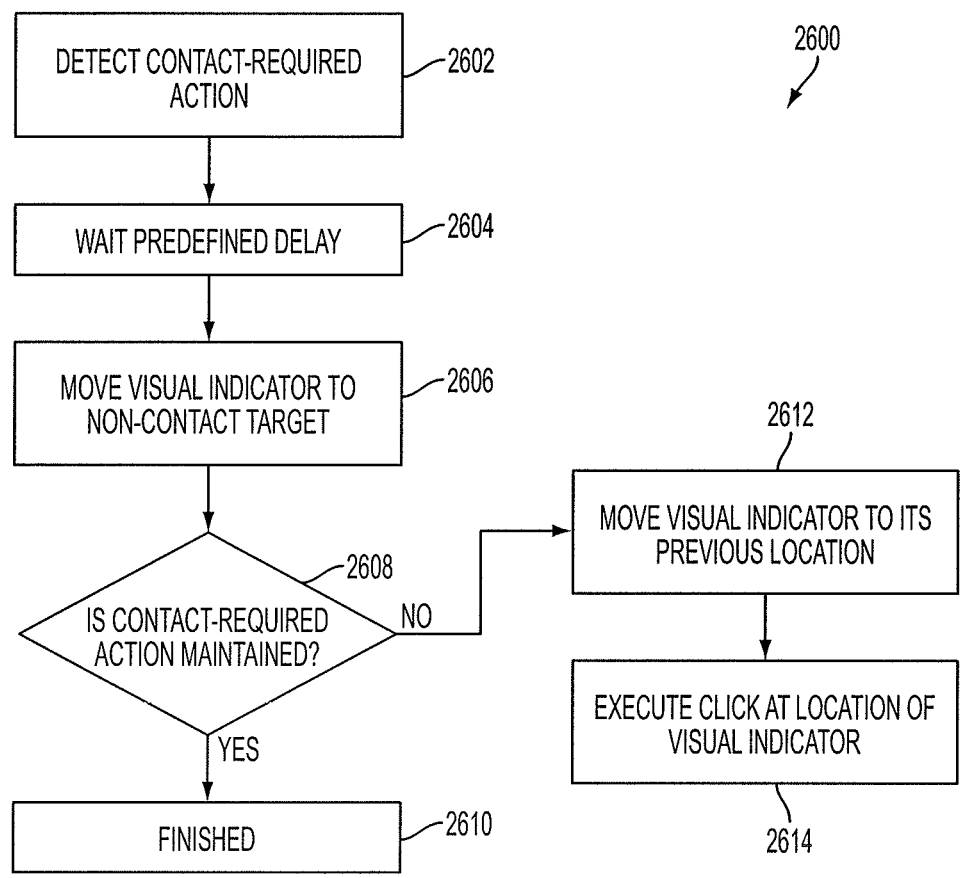
FIG. 26 is a flow chart of a delay warp 2600 without a visual marker according to certain embodiments.

FIG. 26 is a flow chart of a delay warp 2600 without a visual marker according to certain embodiments. At block 2602, a contact-required action is detected, such as a user touching a touchpad. The computer 100 waits for the duration of a predefined length of time (e.g., delay) at block 2604. After the delay, at block 2606, the computer 100 moves the visual indicator (e.g., cursor) to the non-contact target (e.g., gaze target). In alternate embodiments, an additional delay can be incorporated after block 2606 and before block 2608. At block 2608, the computer 100 determines if the contact-required action is maintained, such as if the user is still touching the touchpad. If the contact-required action is maintained, the process is finished at block 2610. If the contact-required action is not maintained at block 2608, the computer 100, at block 2612, can move the visual indicator back to its original position prior to the movement from block 2606. Next, the computer 100 can execute a click at the location of the visual indicator at block 2614.

Figure 27:
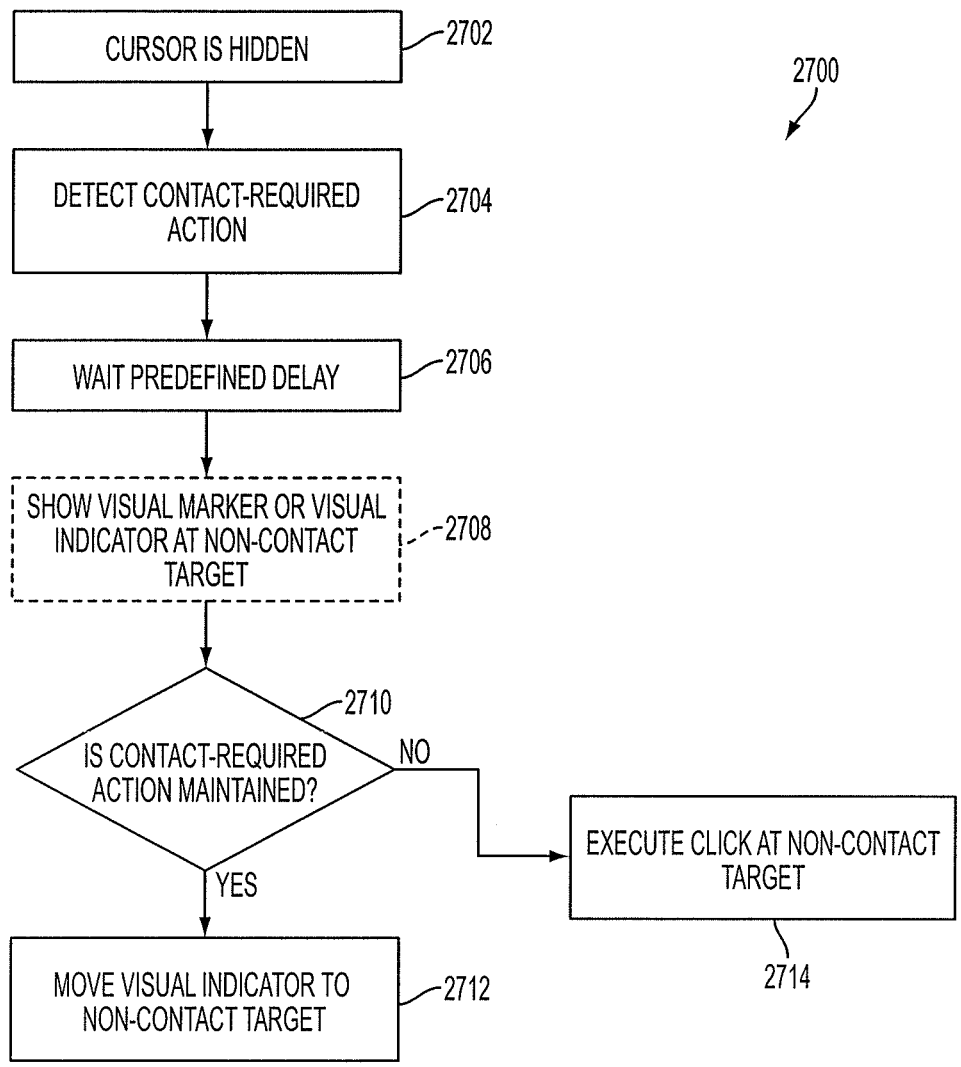
FIG. 27 is a flow chart of a delay warp 2700 without a hidden visual indicator according to certain embodiments.

FIG. 27 is a flow chart of a delay warp 2700 without a hidden visual indicator according to certain embodiments. At block 2702, the visual indicator is in a hidden state. Block 2702 includes all instances where the visual indicator is hidden, including if it has never been displayed previously. At block 2704, a contact-required action is detected, such as a user touching a touchpad. The computer 100 waits for the duration of a predefined length of time (e.g., delay) at block 2706. After the delay, at optional block 2708, the computer 100 can display either a visual marker or the visual indicator (e.g., cursor) at the non-contact target (e.g., gaze target). In alternate embodiments, an additional delay can be incorporated after block 2708 and before block 2710. At block 2710, the computer 100 determines if the contact-required action is maintained, such as if the user is still touching the touchpad. If the contact-required action is maintained, the computer 100 moves the visual indicator to the non-contact target at block 2712. If the contact-required action is not maintained at block 2708, the computer 100, at block 2714, executes a click at the non-contact target.

Figure 28:
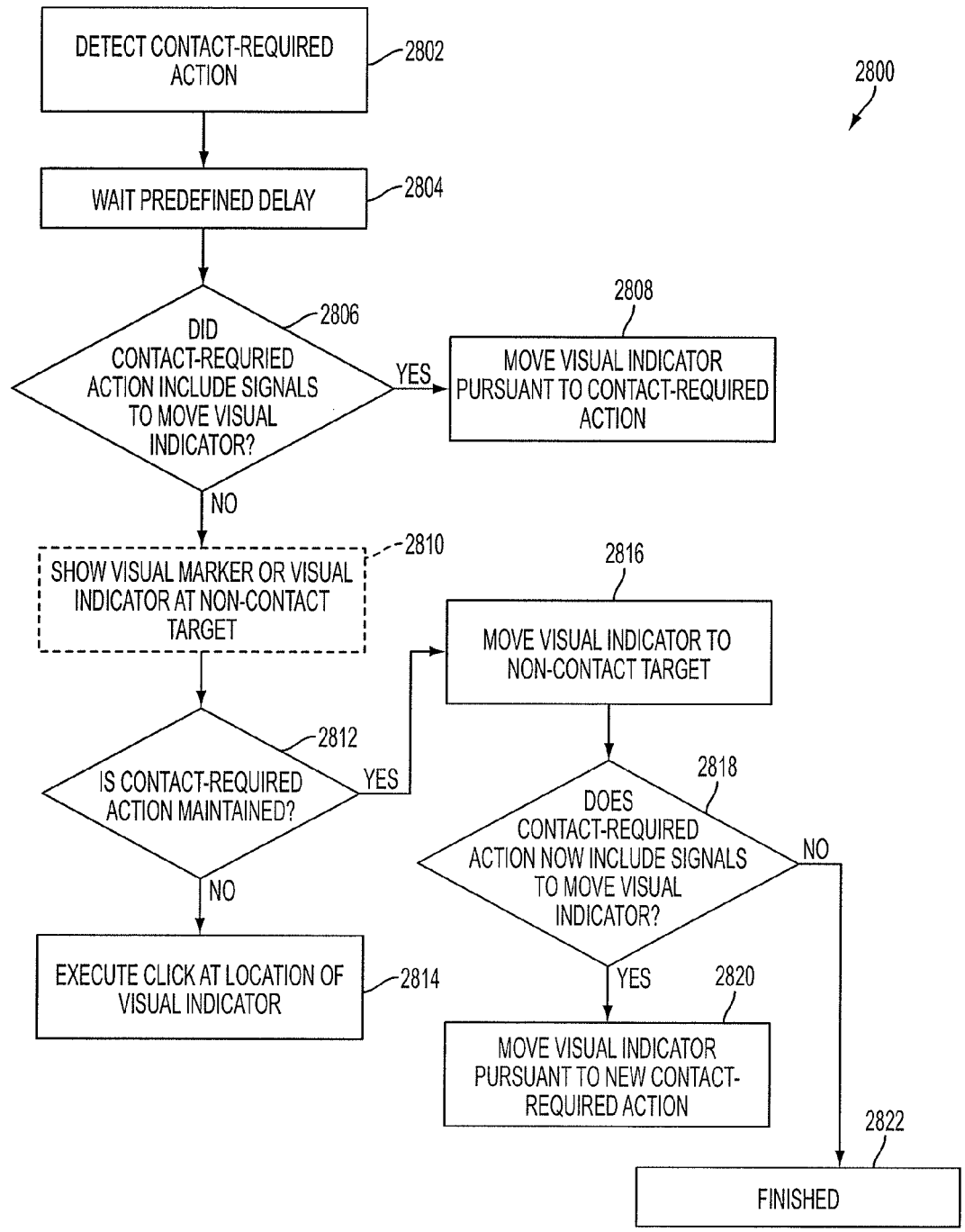
FIG. 28 is a flow chart of a delay warp 2800 according to certain embodiments.

FIG. 28 is a flow chart of a delay warp 2800 according to certain embodiments. At block 2802, a contact-required action is detected, such as a user touching a touchpad. The computer 100 waits for the duration of a predefined length of time (e.g., delay) at block 2804. At block 2806, the computer 100 determines whether the contact-required action includes signals to move the visual indicator (e.g., cursor). Such actions can include swiping a finger along a touchpad or moving a mouse. If the contact-required action includes signals to move the visual indicator (e.g., the user touches a touchpad and moves the finger around), the computer 100, at block 2808, moves the visual indicator pursuant to the contact-required action. If the contact-required action does not include signals to move the visual indicator (e.g., the user touches a touchpad and does not move the finger around), the computer, at optional block 2810, can show a visual marker or the visual indicator at the non-contact target (e.g., gaze target), but then determines, at block 2812, whether the contact-required action is maintained (e.g., the user touches and keeps touching the touchpad). If the contact-required action is not maintained, the computer 100, at block 2814, executes a click at the original location of the visual indicator. If the contact-required action is maintained, the computer 100, at block 2816, moves the visual indicator to the non-contact target. Then, at block 2818, the computer 100 determines whether the contact-required action now includes signals to move the visual indicator (e.g., the user, after seeing the visual indicator move to the non-contact target, begins moving the finger around on the touchpad). If the contact-required action does not now include signals to move the visual indicator, the computer finishes the process at block 2822. However, if the contact-required action does now include signals to move the visual indicator, the computer 100 moves the visual indicator pursuant to the new contact-required action at block 2820. Optionally, upon release of the contact-required action, a "click" or other function may be performed. In some embodiments, the movement of the visual indicator at block 2820 is slower than the movement of the visual indicator at block 2808.

After the delay, at optional block 2808, the computer 100 can display either a visual marker or the visual indicator (e.g., cursor) at the non-contact target (e.g., gaze target). At block 2810, the computer 100 determines if the contact-required action is maintained, such as if the user is still touching the touchpad. If the contact-required action is maintained, the computer 100 moves the visual indicator to the non-contact target at block 2812. If the contact-required action is not maintained at block 2808, the computer 100, at block 2814, executes a click at the non-contact target.

Two-Step Click

A user can perform non-contact actions detectable by a computer 100 through a non-contact input 106, such as an eye-tracking device. In some embodiments, a user can direct gaze at an elements 504 on a display 500 and then perform an additional action in order to perform a computer function (e.g., a click) upon the element 504 upon which the user's gaze is directed. The computer 100 may not display any visual indication of the location of a user's gaze target. Although embodiments described herein refer to a single "additional action" following an initial non-contact action, it should be appreciated that multiple "additional actions" (e.g., a sequence of keystrokes or any sequential or simultaneous combination of non-contact and/or contact-required actions) may be required to trigger a particular computer function in other embodiments.

Figure 7A:
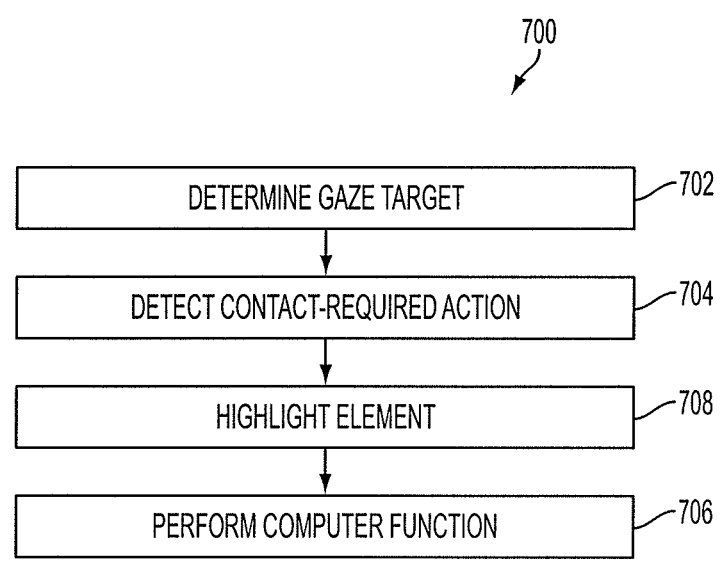
FIG. 7A is a flow chart depicting a multi-step click functionality according to some embodiments.

FIG. 7A is a flow chart depicting a multi-step click functionality 700 according to some embodiments. In a general embodiment, the computer 100 detects a user's gaze target at block 702. The user's gaze target can be located adjacent to or away from a display. The computer 100 then detects a contact-required action (e.g., a button press or a touchpad tap) at block 704. The computer 100 then performs a computer function at block 706, dependent on the gaze target and the contact-required action.

In one embodiment, no visual indication is displayed to the user until after block 704, upon which the computer 100 highlights the element 504 located at or near the gaze target.

Figure 7B:
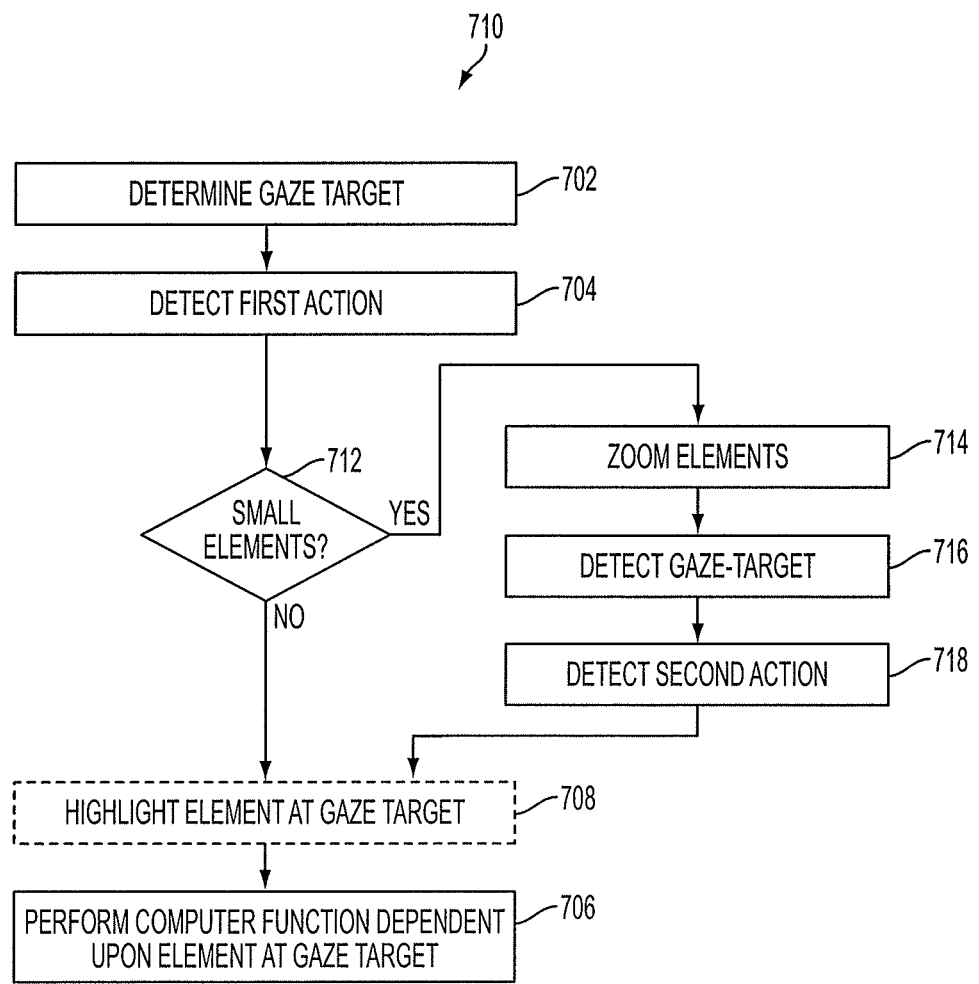
FIG. 7B is a flow chart depicting a multi-step click functionality according to some embodiments.

FIG. 7B is a flow chart depicting a multi-step click functionality 710 according to some embodiments. The computer 100 detects a user's gaze target at block 702. The computer 100 detects a first action (e.g., a button press or a touchpad tap) at block 704. At block 712, the computer 100 then determines whether there are multiple small elements 504 located sufficiently close together adjacent the gaze target. In some instance, multiple elements 504 include instances where each element 504 is sufficiently close to one another that the computer 100 determines additional accuracy is necessary in order for the user to select the desired element 504. At block 714, the computer presents a zoomed image of a portion of the display near the user's gaze target. The portion of the display can be solely the elements 504 or can be the elements 504 and surrounding aspects of the display (e.g., backgrounds). The computer 100 continues to detect the user's gaze target at block 716. Optionally, the computer 100 can additionally highlight any element 504 selected by the user's gaze target at block 716. The computer 100 can detect a second action at block 718. Upon detecting the second action, the computer 100 can optionally highlight the element at the gaze target at block 708 and then perform a computer function dependent upon the element at the gaze target at block 706 (e.g., selecting the element located at the gaze target). In situations where the computer 100 does not detect multiple small elements at block 712, the computer can simply continue directly to optional block 708 and block 706.

In this way, a computer 100 can dynamically adapt to a user's desire to select small or numerous elements on a display using non-contact actions. If a user attempts to select small or numerous elements using non-contact actions, such as through eye-tracking, the computer 100 can dynamically zoom in to allow the user to have better control for picking the correct element. As described above, the first actions and second actions can be contact-required or non-contact actions.

In some embodiments, the first and second actions detected at blocks 704 and/or 718 can be the pressing of a button or touching of a touchpad. In some embodiments, the first and second action detected at blocks 704 and/or 718 can be releasing a button that has already been pressed and/or ceasing to touch a touchpad that has previously been touched. For example, a user can depress a button while moving gaze around a display and release the button when it is desired that the computer function take place. In some embodiments, the second action is a release of a button while the first action is a depression of the same button. Additionally, the first action and second action are generally the same type of actions (e.g., a button press), but need not be.

In some embodiments, the computer 100 can highlight the gaze target and/or the elements at or near the gaze target while the button is depressed. When the user looks at a group of elements that are sufficiently small and close together that the computer 100 will zoom into them (as described above with reference to block 714), the computer 100 can highlight the group of elements, instead of a single element.

In an embodiment, the computer 100 can zoom in on the display when a user initiates an action (e.g., a contact-required action). The computer 100 can zoom in on the display without first determining whether there are multiple small elements located near the gaze target. The computer 100 can otherwise function as described above with reference to FIG. 7B.

In one embodiment, the computer 100 can determine which element 504 at which to locate the gaze target based on a weighting system whereby some items have predetermined weights higher than other items. For example, a button can have a higher weighting than a text box. The determination of which element 504 at which to place the cursor can also consider proximity to the estimated gaze position.

In another embodiment, the computer 100 can provide tactile or audible feedback indicating that an estimated gaze position is able to be determined. In this way, the feedback will indicate to the user whether the system is functioning correctly and if not it will allow the user to alter their behavior to accommodate the function or non-function of the eye tracking device. This feedback can be in the form of a touchpad providing haptic feedback when an estimated gaze position has been determined during a cursor movement procedure.

Figure 29:
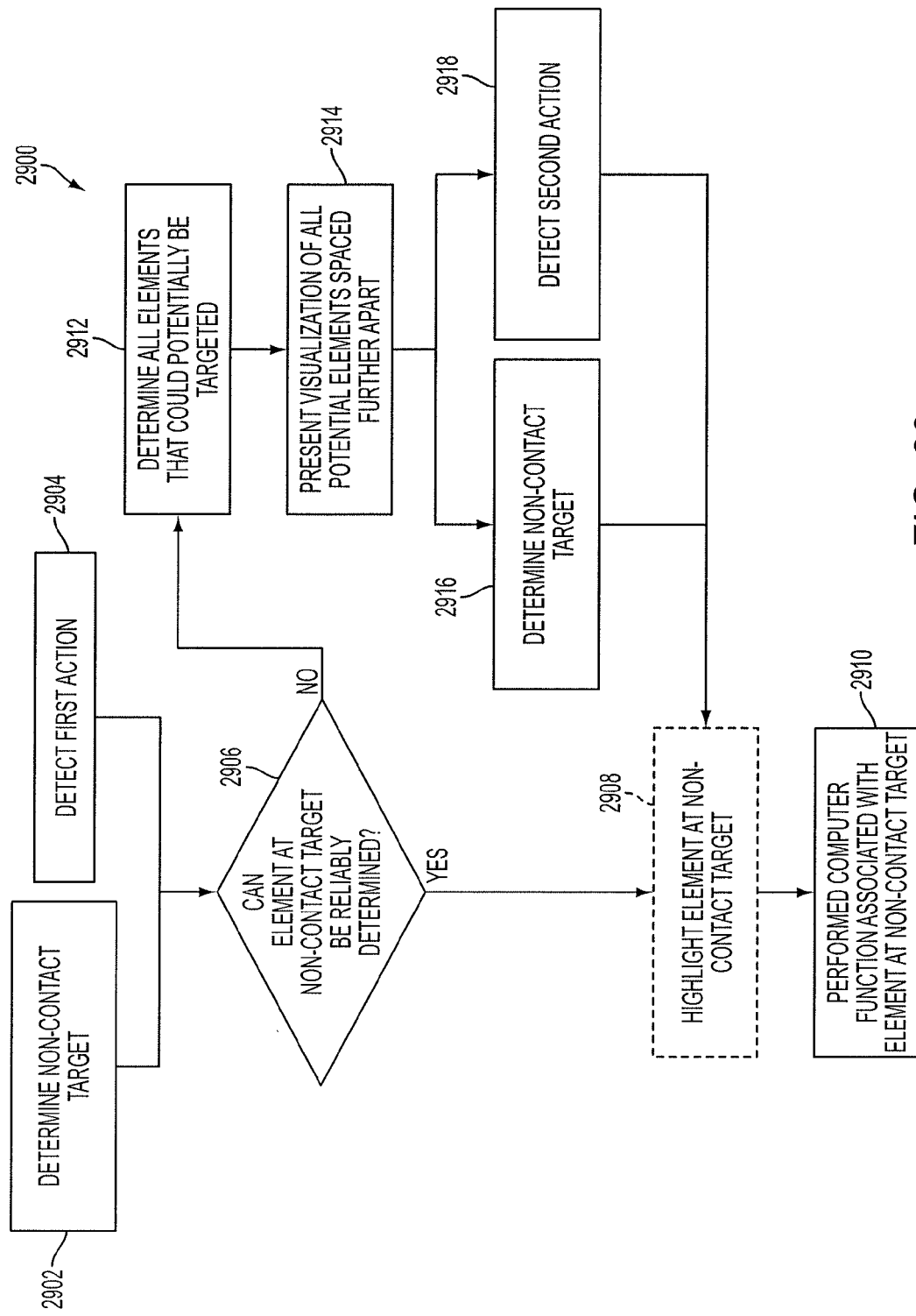
FIG. 29 is a flow chart depicting a two-step click 2900 according to certain embodiments.

FIG. 29 is a flow chart depicting a two-step click 2900 according to certain embodiments. A computer 100 can determine a non-contact target (e.g., gaze target) at block 2902 and detect a first action at block 2904. The first action can be a contact-required action (e.g., a button click) or a non-contact action. Optionally, multiple elements provided on a display can be highlighted at once as the computer 100 determines a non-contact target is located on or near the elements. At block 2906, the computer 100 determines if an element at the non-contact target can be reliably determined. In other words, the computer 100 determines whether it is able to determine, with enough certainty, which element the user is intending to target. The computer 100 can consider multiple parameters to determine which element or elements the user is intending to target. These parameters can be pre-set and/or user-set, but comprise two decision points. Firstly, the computer 100 determines expected tracking deviation based on factors that can include user preference set by the user. Such preferences can include, for example, whether the user desires speed or accuracy, user eye tracking quality including whether the user is wearing glasses, contact lenses or the like, the quality of a calibration function mapping the user's gaze, estimates of offsets of the detected user's gaze relative to the actual location of the user's gaze, signal noise in the eye tracking system, configuration, type and frequency of the eye tracker or a global parameter for determining expected gaze point deviation which may override other factors. If the desired element can be reliably determined, the computer 100 can optionally highlight the element at the non-contact target at block 2908. The computer 100 can then perform a computer function associated with the element at the non-contact target (e.g., selecting the element or opening the element or others). Secondly, the computer 100 determines possible targets at block 2912 based on factors including geometries of elements near the gaze target such as how close together multiple elements are and the size and/or shape of the elements, layout of the elements, visual point of gravity of the elements representing weightings of the elements such that a gaze target may be weighted towards an element in a gravity-like manner, grouping criteria including grouping elements of the same interaction type, contextual input from the user such as a preference towards avoiding functions such as delete or the like and whether based on the user's gaze point the user has seen an element highlight. At block 2914 the computer 100 determines the properties of a region in which to present a visualization of all potential elements. The computer 100 may consider various factors such as the size and layout of elements including possible targets determined at block 2912, a maximum size of a visualization of spaced apart elements, a magnification level set by the user or predetermined by the computer 100 and grouping criteria for analyzing displayed elements. The computer 100, at block 2914, can then present a visualization of all potential elements identified in block 2912 with each element spaced further apart. Optionally, elements displayed at block 2914 can be highlighted as a user's gaze locates upon them. An example of spacing further apart at block 2914 can include simply zooming in on the area where the elements are located (i.e., increasing the space between the elements with respect to the size of the display device 104). Another example of spacing further apart at block 2914 can include enlarging and/or moving each individual element further apart on the display to provide greater separation (e.g., moving four elements in a square configuration taking up a small portion of the display to a line formation extending across substantially most of the display). At blocks 2916 and 2918, the computer 100 can determine the non-contact target again and detect a second action, respectively, in order to identify a targeted element. The computer 100 can optionally highlight the targeted element at block 2908. The computer 100 can perform a computer function associated with the targeted element at block 2910 (e.g., clicking the element).

In enhancements to the embodiment shown in FIG. 29, at block 2904 the computer 100 can receive a maintained first action, such as constant pressure on a touchpad, a held down button, or the like. As the user is maintaining a first action, the user is actively selecting elements and thus is prepared for multiple elements to be highlighted prior to block 2906 and at block 2914. At block 2910 the user releases the maintained first action and the computer 100 performs a computer function associated with the element at the non-contact target.

Further Embodiments

In some embodiments, the computer 100 is able to detect non-contact actions to switch the focus of windows in the display. In an embodiment, when a user looks at a non-active window and initiates an action (e.g., a contact-required action or a non-contact action), the non-active window becomes the active window. In this embodiment, an eye tracking device determines the location of a user's gaze relative to a display 200, if the computer 100 determines the gaze target to be located in a window or area not currently in an active state, the user can instruct the computer 100 to make the window or area active by providing a contact-required action whilst gazing at the non-active window or area. In alternate embodiments, the user can fixate their gaze within the non-active window or area for a predetermined period of time instead of providing a contact-required action, in order to make the window or area active.

In an embodiment, a user can scroll a window or screen area by looking towards an edge of the screen, window, or area and initiating an action such as a contact-required action. Depending on whether the user was looking towards the top, bottom, left, right, or diagonal edge of the screen, window, or area, the area or window can scroll up, down, left, right or diagonal. For example, if a user is looking towards the bottom of an area or window and initiates an action such as a contact-required action, the contents of the area or window at the bottom of the area or window can scroll upwards to the top of the window or area, effectively revealing new information from the bottom of the area or window. This functionality can operate in the same manner for every direction at which the user is gazing. For example if the user is gazing towards the left edge when initiating an action, the information at the left edge will move towards the right edge and effectively scroll information from of the left of the area or window towards the right of the area or window. In an embodiment, when a user looks at a point within a window or area and initiates an action (e.g., a contact-required action), the computer 100 will scroll the window or area so that point identified by the user is moved to a predetermined location in the window (e.g., the top of the window or the center of the window). In these embodiments, where an area such as an edge, top/bottom, left/right, or other is mentioned, the computer 100 can determine based on a gaze offset or deviation an area near the edge, top/bottom, left/right, or other in which to enact the functions described.

In some embodiments, the computer 100 is able to directly scroll the window by a predetermined amount for gaze interactions. In alternate embodiments, the computer 100 uses the gaze interactions to emulate button presses, such as presses of arrow buttons (e.g., arrow up or arrow down) or page buttons (e.g., page up or page down), in order to scroll the window.

In some embodiments, the computer 100 can provide a visual indication (e.g., a different cursor or other indication) that the gaze target is located in a particular zone or area defined for scrolling (e.g., near the top edge of the screen for scrolling up).

In an embodiment, a user can scroll a window by holding a contact-required input (e.g., a button or touchpad) while gazing in a direction of scroll (e.g., top, bottom, or side of the computer screen). A gaze to an edge of a screen, window, or area can scroll information from that edge towards the center of the screen, window, or area. The scrolling can be momentum based scrolling, meaning that the rate of scrolling will gradually increase to a predetermined maximum speed the longer the contact-required input is held (e.g., the longer the button is pressed or the longer the touchpad is touched without release). In some embodiments, once the button or touchpad is released, the scrolling will not cease immediately, but will rather slow rapidly until coming to a complete stop. The speed at which the scrolling increases whilst the button or touchpad is held down and at which the scrolling decreases after release can be adjusted by the computer 100. Optionally the adjustment can be altered by a user.

In some embodiments, a user can scroll a window simply by looking at the edge of the window (e.g., the top, bottom, or sides of the window). The window can scroll by a predetermined increment for each look towards the edge of the window. In some embodiments, the scrolling will only happen if the user looks towards the edge of the window and simultaneously initiates an action, such as a non-contact action like a voice command. In other embodiments, the increment can depend on the location of the user's gaze and can update continuously. In this way natural scrolling is achieved, for example if a user gazes towards the edge of a map constantly the map scrolls by small increments to smoothly scroll the map. The scrolling can occur without the user simultaneously initiating an action.

In some embodiments, a user can scroll a window by looking at a desired location and performing an action (e.g. pressing a button or saying "scroll"), at which point the computer 100 will cause the portion of the window and/or display located at the gaze target to move to the center of the window and/or display. In some embodiments, a computer 100 can determine whether to scroll or zoom, depending upon the location of the gaze target (e.g., location of the gaze target with respect to a window). For example, if a user looks at a window containing a map and moves the gaze target to an edge of the map, pressing a button can cause the map to scroll so the targeted location is now at the center of the map. However, if the same user looks at or near the center of the map, pressing a button can cause the map to zoom. In some additional embodiments, the speed of an action (e.g., zooming or scrolling) can be controlled based on the location of the gaze target (e.g., location of the gaze target with respect to a window). For example, when a user looks at the edge of a window and presses a button, the window can scroll quickly, whereas if the user looks somewhere between the same edge of the window and the center of the window, the window would scroll less quickly.

In some embodiments, the scrolling is based on the length or pressure of contact by a user upon a key, button, or touchpad. For example, a window can scroll by greater increments when a user holds a key, button, or touchpad down longer.

In various embodiments, scrolling can be terminated by performing or ceasing actions (e.g., contact-required actions). In some embodiments, scrolling is slowed before completely terminating. In some embodiments, scrolling can be slowed by the user gradually moving the gaze target away from a predetermined area (e.g., edge of the screen or area where the gaze target was upon initiation of scrolling).

In some embodiments, a tap of a contact-required input (e.g., quick button press, quick tap on a touchpad, or movement of a computer mouse) can cause a visual indicator to appear on the display, or alternatively enact a click at the last known position of a visual indicator or at the gaze location. Thereafter, holding the finger on the contact-required input (e.g., holding a finger on a touchpad) can move the visual indicator to the gaze target.

In some embodiments, movement of a computer mouse can cause the visual indicator to appear on the display at the gaze target. In some embodiments, after the visual indicator has appeared at the gaze target, use of a contact-required input (e.g., computer mouse) to move the visual indicator (e.g., cursor) can be slowed while the visual indicator is near the user's gaze target. In some embodiments, a user can initiate an additional action (e.g., a contact-required action such as pressing and holding a mouse button) on an element (e.g., an icon) while using a computer mouse. The user's gaze can then be moved towards a desired destination and the mouse button can be released in order to drag the element to the desired destination (e.g., to move an item into another folder). In this manner, a user can select an item on a display by locating a visual indicator on or near the item either by using a gaze enabled visual indicator movement method described previously, or by moving a computer mouse, touchpad or the like. The user can then hold down an activator such as a computer mouse or maintain contact on a touchpad to select the item, when the user releases the activator, the item moves to the location of the user's gaze on the display. Therefore, the user can "grab" an item such as an icon and "drag" the icon to the user's gaze location, whereupon on release of an activator the icon is relocated to the user's gaze location.

In some embodiments, performing an action such as a contact-required action (e.g., clicking a mouse button) can cause the visual indicator to move to the gaze target. In some embodiments, holding the contact-required action (e.g., pressing and holding the mouse button) can move the visual indicator to the gaze target and allow for the user to fine-tune the position of the visual indicator before releasing the contact-required action (e.g., releasing the mouse button) to perform an action at the visual indicator's location (e.g., select an element). While the contact-required action is being held, large movements of gaze target can translate to smaller movements of the visual indicator, in order to allow a user to more finely adjust the location of the visual indicator.

In an embodiment, initiating an action (e.g., a contact-required action) can open a menu at the gaze target. A user can look at the desired menu item and initiate a second action (e.g., second contact-required action or release of a maintained first contact-required action) to select that menu item. In some embodiments, holding gaze on or near the menu item for a predetermined period of time can act to select that menu item.

In an embodiment, an edge menu or button can be opened (e.g., displayed) by holding a contact-required action, looking to the edge of the display, and releasing the contact-required action. In some cases, the computer 100 presents a visual indication that opening a menu is possible when the user looks to the edge of the screen with the contact-required action held. If the user looks away from the edge of the display without releasing the contact-required action, the menu does not open. For example the user can hold or maintain a contact-required action and look towards an edge of a display. A glow or other visual indicator can appear at the edge of the display indicating a menu can be opened. If the contact-required action is ceased while the glow or other visual indicator is present, the menu appears on screen. If the contact-required action is ceased while the glow or other visual indicator is not present, no menu appears on screen. The menu can occupy the full screen or part of the screen. The menu can alternatively be a button, for example a button representing a "back" movement in a web browser the like.

In an embodiment, initiating an action (e.g., a contact-required action such as actuating a scroll wheel) will zoom the display in or out at the gaze target. In an embodiment, initiating an action (e.g., a double-tap on a touchpad) can zoom the display in at the gaze target. In an embodiment, initiating an action (e.g., tapping the touchpad while holding down a shift button) can zoom the display out at the gaze target. In a further embodiment, movement of two fingers towards each other such as a "pinch" movement on a touchpad, touch screen or the like can enact a zoom in or out, and movement of two fingers away from each other can enact the opposite zoom in or out movement.

In an embodiment, in order to activate a non-contact input mode, the user looks towards the edge of the display device 104. The computer 100 determines that the gaze target is at or near the edge of the display device 104 and activates a non-contact input mode. In some embodiments, the computer 100 displays an input menu over or adjacent the display 200. When the user looks away from the edge of the display 200, the input menu can disappear immediately, remain on the display 200 indefinitely, or disappear after a predetermined amount of time. The user can activate an icon on the input menu by performing a contact-required action while gazing at an icon or by using a non-contact activation method such as dwelling their gaze in the vicinity of an icon for a predetermined period of time, for example one second, or blinking an eye or eyes, which can be interpreted by the computer as an activation command. Each icon can be associated with a computer function. When an icon is activated, the computer 100 can provide an indication of activation, such as a change in the appearance of the icon, a sound, physical feedback (e.g., a haptic response), or other indication.

A place cursor icon can be activated to place the mouse cursor on a desired point or position. The place cursor icon can be used for mouse-over functions (e.g., functions where a mouse click is not desired). A gaze scroll icon can be activated to enable gaze-controlled scrolling within a scrollable window, as described in further detail below. A left click icon can be activated to perform a single left-click (e.g., emulate a physical left-click on an attached computer mouse). A double click icon can be activated to perform a double left-click (e.g., emulate a physical double-click on an attached computer mouse). A right click icon can be activated to perform a single right-click (e.g., emulate a physical right-click on an attached computer mouse). A gaze drag and drop icon can be activated to enable the gaze drag and drop mode. The gaze drag and drop mode allows a user to use non-contact input to emulate a drag and drop action on a physical mouse (e.g., click and hold the mouse, move the mouse, release the mouse), as described in further detail below. A gaze keyboard icon can be activated to open an on-screen, gaze-enabled keyboard for typing using gaze, as described in further detail below. A settings icon can be activated to open a settings window or dialog.

As described above, the gaze scroll icon can be activated to enable gaze-controlled scrolling. When gaze-controlled scrolling is activated, the user can scroll windows (e.g., up and down, as well as left and right) using non-contact inputs. In one embodiment, the user can place a scroll indicator on the window and look above the scroll indicator to scroll up, look below the scroll indicator to scroll down, look to the left of the scroll indicator to scroll left, and look to the right of the scroll indicator to scroll right. The user can place the scroll indicator by first enabling gaze-controlled scrolling (e.g., dwell gaze on the gaze scroll icon), then looking at any scrollable area and dwelling gaze upon that area until the scroll indicator appears. When the user desires to disable gaze-controlled scrolling, the user can gaze outside of the screen or back to the input menu.

As described above, the gaze drag and drop icon can be activated to enable the gaze drag and drop mode. When the gaze drag and drop mode is enabled, the user can gaze at a first location and provide a user signal (e.g., dwelling gaze, blinking, winking, blinking in a pattern, or using a contact input such as a button) which causes the computer to emulate a mouse click and hold at the first location. The user can then move gaze to a second location and provide a second user signal, which causes the computer to emulate moving the mouse to the second position and releasing the mouse button.

In some embodiments, once a user has selected an icon on the input menu, the icon selected may not be de-selected unless a new selection on the input menu is made. In other embodiments, the icon can be de-selected, such as by gazing at the same icon again.

In some embodiments, to facilitate using the action selected on the input menu, the computer 100 can provide for a portion of the display to be zoomed (e.g., displayed at a lower resolution). For example, when the user selects the "left click" icon on the input menu and gazes at a portion of the display, an area around the gaze point on the display can zoom so that the user can then select the intended target for their action with greater ease by gazing at the enlarged portion of the display.

In some cases, the user can perform a certain action (e.g., contact-required action or non-contact action) in order to select an area of the display upon which a computer function is to be performed, at which point the computer 100 can display an input menu at or around that point to select the desired computer function.

In a further improvement, the input menu can also be provided external to the display 200 and/or display device 104. In this manner it can be provided on an input device such as an eye tracking device, on the housing of a display, or on a separate device. The menu can then be comprised of a separate display, or another means of conveying information to a user such as light emitting diodes, switches or the like. In another embodiment, the action of choosing an icon on the external input menu is shown as a transparent image of that icon at an appropriate position on the regular display. In some embodiments, the gaze target used to identify the desired icon to be activated can be located outside the display 200 and/or display device 104.

In some embodiments, a user can perform computer functions on or at the area at or near the gaze target via voice interaction. Once an area has been selected (e.g., by focusing gaze at the area), an action can be performed by the user speaking certain words such as "open", "click" and the like, which would be readily understood by a skilled addressee.

In some embodiments, selection of a computer function on an input menu can comprise multiple steps and can also comprise multiple menus. For example a user can select an icon or menu using any input method herein described, and then select a second icon or menu for selecting a computer function to be performed.

In some embodiments, a gaze-tracking device can discern the identity of the user (e.g., through a user's gaze patterns or biometric data such as distance between eyes and iris sizes) in order to customize functionality for that particular user (e.g., use particular menus and/or features or set up desired brightness settings or other settings).

In some embodiments, a computer 100 will perform certain functions based on a discernible series or sequence of gaze movements (e.g., movements of the gaze target).

In some embodiments, a computer 100 can determine what various computer functions are available to be performed in whole or in part by non-contact actions based on what elements are presented on the display 200.

In some embodiments, performing an action can cause information to be presented on the display 200 based on the gaze target. For example, pressing a button can cause a list of active computer programs to appear on the display 200. A user can interact with the presented information (e.g., list of active computer programs) by gazing at parts of the information. For example, a user can press a button to cause a list of active computer programs to appear on the display 200, then look at a particular program and release the button in order to cause that particular program to gain focus on the computer 100.

Many examples presented herein are described with respect to gaze tracking. It will be understood that, where applicable, tracking of other non-contact actions (e.g., 3-D gestures or others) can be substituted for gaze tracking. When tracking of other non-contact actions is substituted for gaze tracking, references to gaze targets should be considered references to non-contact targets.

Location of a gaze target can be determined from detection of various actions, including movement of the eyes, movements of the face, and movements of facial features. For example, scrolling function (e.g., scrolling a page up or down) can be controlled by the user's face tilting (e.g., up or down) while the user reads the display 200, wherein the computer 100 does not control scrolling function based on eye tracking at that time.

In some cases, camera based gaze detection systems can rely on facial recognition processing to detect facial features such as nose, mouth, distance between the two eyes, head pose, chin etc. Combinations of these facial features can be used to determine the gaze target. For example, in embodiments where vertical scrolling (e.g., a scroll up function and/or a scroll down function) is to be performed based on face images from a camera, the detection of the gaze target can rely solely or in part on detected eyelid position(s). When the user gazes at the lower portion of the display device 104, the eye will be detected as being more closed, whereas when the user gazes at the top of the display device 104, the eye will be detect as being more open.

Eye lid position detection is good for determining changes in gaze target in a vertical direction, but not as effective for determining changes in gaze target in a horizontal direction. For better determining changes in gaze target in a horizontal direction, images of the head pose can be used instead. In such cases, a gaze target can be determined to be within scroll zones only when the user's face is determined to be oriented in the general direction of the display device 104. As general rule, whenever a user looks at an object more than seven degrees off from a direct forward line of sight, the user's head will immediately turn in the direction of that object. Thus, a head pose indicating more than seven degrees off to a side from the display device 104 is an indication that the user is unlikely to be looking at the content (e.g., the display 200) presented on the display device 104.

Depending on the sensitivity and accuracy of the gaze detection components, which can be dictated by camera resolution, processing power, available memory, and the like, a gaze target can occupy a smaller (e.g., more sensitive and/or accurate) or larger (e.g., less sensitive and/or accurate) area relative to the display device 104. Calibration of the gaze detection components can also play a role in the accuracy and sensitivity of gaze target calculations. Accuracy or sensitivity can dictate the relationship between an actual direction of a user's gaze and the calculated gaze target. The disclosed embodiments can function even if the relationship between the actual gaze direction and calculated gaze target is not direct.

In some embodiments, the gaze target can be calibrated by using input from a touch screen to assist with calibration. For example, the computer 100 can prompt the user to look at and touch the same point(s) on the display device 104. Alternatively, such a calibration process can be performed in the background without prompting the user or interrupting the user's normal interaction with the computer 100. For example, while normally operating the computer 100, a user will be pressing buttons, hyperlinks, and other portions of the display 200, display device 104, and/or computer 100 having known positions. It can be assumed that the user will normally also be looking at the buttons, hyperlinks, etc. at the same time. Thus, the computer 100 can recognize the touch point or click point as direction of the user's gaze and then correct any discrepancies between the direction of the user's gaze and the calculated gaze target. Such a background calibration process can be helpful in order to slowly improve calibration as the user interacts with the computer 100 over time.

In some embodiments, a computer 100 is able to determine when a user is reading elements 504 on a display 200 rather than attempting to control the computer 100. For example, detection of whether a user is reading can be based on detecting and evaluating saccades and whether an eye fixates or dwells on or around a constant point on the display. This information can be used to determine indicators of reading as distinguished from a more fixed gaze. In some embodiments, the computer 100 is configured such that scrolling functions can be initiated even when the user is determined to be reading. For instance when the user is looking at a map, the scrolling (e.g., panning) should be initiated relatively faster than when the user is reading text (e.g., a word-processor document). Thus any dwell time before triggering a scroll function when reading text can be longer than for reviewing maps and other graphical content, and the scroll zones and/or scroll interactions can be chosen differently in each case. For example, the scroll zone(s) may have to be made larger in the case of a map or other graphical content in order to make the computer 100 sufficiently responsive, while scroll zone(s) for a text document may be smaller because a scroll action is typically not required until the user is reading text very close (e.g., 5 lines) to the bottom or top of a window.

Various embodiments are disclosed herein that can correlate certain actions with computer functions. In additional embodiments, where applicable, a computer 100 can be placed in one or more modes, wherein each mode enables different computer functions to be performed in response to a user performing various actions.

In some embodiments, the computer 100 can be configured to use gaze data patterns (e.g., the frequency with which gaze targets appear in certain positions or locations relative the display device 104) to determine with greater accuracy, based on statistical analysis, when a user is looking at a particular zone 202 or element 504.

FIGS. 8-24D depict graphical representations and flow charts of various embodiments and functionality disclosed herein.

Although embodiments have been described referencing contact required and non-contact required actions, it is intended to be understood that these actions can be interlaced. In other words, if an embodiment is described using a contact required action such as movement of a mouse, touchpad contact, pressing of a button or the like, it is intended that such an action can also be performed by using a non-contact method such as a voice command, gesture, gaze movement or the like.

All patents, publications and abstracts cited above are incorporated herein by reference in their entirety. Any headers used herein are for organizational purposes only and are not to be construed to limit the disclosure or claims in any way. Various embodiments have been described. It should be recognized that these embodiments are merely illustrative of the principles of the present disclosure. Numerous modifications and adaptations thereof will be readily apparent to those skilled in the art without departing from the spirit and scope of the present disclosure as defined in the following claims.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited.

As used below, any reference to a series of examples is to be understood as a reference to each of those examples disjunctively (e.g., "Examples 1-4" is to be understood as "Examples 1, 2, 3, or 4").

Example 1 is a method of controlling a computer. The method includes presenting a display having a visual indicator; detecting a gaze target of a user; detecting a contact-required action of a user; and performing a computer function in response to the contact-required action and the gaze target. Performing the computer function includes performing a first function. The first function can be scrolling a first portion of the display, in response to detection of the contact-required action, based on the location of the gaze target with respect to the display. The first function can be scrolling a second portion of the display, in response to continued detection of the contact-required action, based on the location of the gaze target with respect to the display. The first function can be moving the visual indicator to the gaze target in response to the contact-required action. The first function can be moving the visual indicator at a first rate slower than a second rate of movement of the gaze target in response to continued detection of the contact-required action. The first function can be zooming a third portion of the display adjacent the gaze target in response to the contact-required action. The first function can be performing a second function, in response to the contact-required action, based on the gaze target when the gaze target is outside the display. The first function can be performing a second computer function, in response to the contact-required action, based on a sequence of movements of the gaze target.

Example 2 is the method of example 1, where the first function is scrolling the second portion of the display, in response to continued detection of the contact-required action, based on the location of the gaze target with respect to the display. The continued detection of the contact-required action is detection of continued touching of a touchpad.

Example 3 is the method of examples 1 or 2, where the first function additionally includes increasing the momentum of the scrolling until detection of continued touching of the touchpad ceases.

Example 4 is the method of example 1 where the first function is moving the visual indicator to the gaze target in response to the contact-required action. The contact-required action is one of the group consisting of touching a touchpad or moving a computer mouse.

Example 5 is the method of example 1, where the first function is zooming a third portion of the display adjacent the gaze target in response to the contact-required action. The contact-required action is actuation of a scroll wheel.

Example 6 is the method of example 1, where the first function is zooming a third portion of the display adjacent the gaze target in response to the contact-required action. The contact-required action is a combination of depressing a button and performing a second contact-required action.

Example 7 is the method of example 1, where the contact-required action is touching a touch-sensitive device.

Example 8 is a computing device having a computer including a display device for presenting a display having a visual indicator. The computer further includes a contact-required input and a non-contact input. The computer is programmed to detect a non-contact target of a user and detect a contact-required action of the user. The computer is further programmed to perform a computer function, in response to the contact-required action, based on the non-contact target, wherein performing the computer function includes performing a first function. The first function can be scrolling a first portion of the display, in response the contact-required action, based on the location of the non-contact target with respect to the display. The first function can be scrolling a second portion of the display, in response to continued detection of the contact-required action, based on the location of the non-contact target with respect to the display. The first function can be moving the visual indicator to the non-contact target in response to the contact-required action. The first function can be moving the visual indicator at a first rate slower than a second rate of movement of the non-contact target in response to continued detection of the contact-required action. The first function can be zooming a third portion of the display adjacent the non-contact target in response to the contact-required action. The first function can be performing a second function, in response to the contact-required action, based on the non-contact target when the non-contact target is outside the display. The first function can be performing a second computer function, in response to the contact-required action, based on a sequence of movements of the non-contact target.

Example 9 is the computing device of example 8, where the first function is scrolling the second portion of the display, in response to continued detection of the contact-required action, based on the location of the non-contact target with respect to the display. The continued detection of the contact-required action is detection of continued touching of a touchpad.

Example 10 is the computing device of example 9, where the first function additionally includes increasing the momentum of the scrolling until detection of continued touching of the touchpad ceases.

Example 11 is the computing device of example 8, where the first function is moving the visual indicator to the non-contact target in response to the contact-required action. The contact-required action is one of the group consisting of touching a touchpad or moving a computer mouse.

Example 12 is the computing device of example 8, where the first function is zooming a third portion of the display adjacent the non-contact target in response to the contact-required action. The contact-required action is actuation of a scroll wheel.

Example 13 is the computing device of example 8, where the first function is zooming a third portion of the display adjacent the non-contact target in response to the contact-required action. The contact-required action is a combination of depressing a button and performing a second contact-required action.

Example 14 is the computing device of example 8, where the contact-required action is touching a touchpad.

Example 15 is the computing device of example 8, where the non-contact input is a gaze-tracking device and the non-contact target is a gaze target.

Example 16 is a system having a computer, the computer including a display device for presenting a display having a visual indicator; an eye-tracking device for detecting a gaze target; a contact-required input for detecting a contact-required action; and a processor operably connected to the eye-tracking device, contact-required input, and display device. The computer further includes programming enabling the processor to perform a computer function, in response to the contact-required action, based on the non-contact target, wherein performing the computer function includes performing a first function. The first function can be scrolling a first portion of the display, in response the contact-required action, based on the location of the gaze target with respect to the display. The first function can be scrolling a second portion of the display, in response to continued detection of the contact-required action, based on the location of the gaze target with respect to the display. The first function can be moving the visual indicator to the gaze target in response to the contact-required action. The first function can be moving the visual indicator at a first rate slower than a second rate of movement of the gaze target in response to continued detection of the contact-required action. The first function can be zooming a third portion of the display adjacent the gaze target in response to the contact-required action. The first function can be performing a second function, in response to the contact-required action, based on the gaze target when the gaze target is outside the display. The first function can be performing a second computer function, in response to the contact-required action, based on a sequence of movements of the gaze target.

Example 17 is the system of example 16 where the first function is scrolling the second portion of the display, in response to continued detection of the contact-required action, based on the location of the gaze target with respect to the display. The continued detection of the contact-required action is detection of continued touching of a touchpad.

Example 18 is the system of example 16, where the first function additionally includes increasing the momentum of the scrolling until detection of continued touching of the touchpad ceases.

Example 19 is the system of example 16, where the first function is moving the visual indicator to the gaze target in response to the contact-required action. The contact-required action is one of the group consisting of touching a touchpad or moving a computer mouse.

Example 20 is the system of example 16, where the first function is zooming a third portion of the display adjacent the gaze target in response to the contact-required action. The contact-required action can be actuation of a scroll wheel. The contact-required action can be a combination of depressing a button and performing a second contact-required action.

Example 21 is the system of example 16, where the contact-required action is touching a touchpad.

What is claimed is:

1. A method of providing user input to a computer device, the method comprising:
    detecting a user gaze relative to a display;
    detecting a contact action from the user while a visual indicator is displayed at a first location of the display, the first location being different from a location of the user gaze,
        wherein the contact action is associated with performing a computer input function, and
        wherein the contact action comprises of at least one of: physical contact with a contact-required input device or close proximity to the contact-required input device;
    upon detection of the contact action, continuing to display the visual indicator at the first location while displaying a visual marker at the location of the user gaze;
    detecting that the contact action is maintained for a predefined period of time, wherein during the predefined period of time performing the computer input function associated with the contact action is delayed and the visual indicator remains at the first location;
    after the predefined time period and in response to detecting a cessation of the contact action during the predefined period of time, performing the computer input function associated with the contact action at the first location of the display; and
    after the predefined time period and in response to detecting a continuation of the contact action after the predefined period of time, moving the visual indicator to the location of the user gaze.

2. The method of claim 1, wherein the contact action may be any of depressing a button or touching a touch-sensitive device.

3. The method of claim 1, wherein the predefined period of time is approximately 200 milliseconds (ms).

4. The method of claim 1, further comprising, after moving the visual indicator to the location of the user gaze, performing a second computer input function at the location of the visual indicator.

5. The method of claim 1, further comprising:
    in response to detecting a further continuation of the contact action after moving the visual indicator to the location of the user gaze, moving the visual indicator at a slower rate and in a direction indicated by an additional user input until the further continuation of the contact action is no longer detected.

6. The method of claim 5, wherein the additional user input is the detected movement of the user's gaze.

7. The method of claim 5, further comprising, after the contact action is no longer detected, performing a second computer input function at the location of the visual indicator.

8. A computing device, comprising: at least one processor, a memory component, a display device, a gaze-detection device, and at least one additional user input device; wherein the processor is programmed to: detect a user gaze relative to a display: detect a contact action from the user while a visual indicator is displayed at a first location of the display, the first location being different from a location of the user gaze; wherein the contact action is associated with performing a computer input function, and wherein the contact action comprises of at least one: of physical contact with a contact-required input device or dose proximity to the contact-required input device; upon detection of the contact action, continuing to display the visual indicator at the first location while displaying a visual marker at the location of the user gaze; detecting that the contact action is maintained for a predefined period of time, wherein during the predefined period of time and while the visual indicator is displayed at the first location, performing the computer input function associated with the contact action is delayed and the visual indicator remains at the first location; after the predefined period of time and in response to detecting a cessation of the contact action during the predefined period of time, performing the computer input function associated with the contact action at the first location of the display; and after the predefined period of time and in response to detecting a continuation of the contact action after the predefined period of time, moving the visual indicator to the location of the user gaze.

9. The computing device of claim 8, wherein the contact action may be any of depressing a button or touching a touch-sensitive device.

10. The computing device of claim 8, wherein the predefined period of time is approximately 200 milliseconds (ms).

11. The computing device of claim 8, further comprising, after moving the visual indicator to the location of the user gaze, performing a second computer input function at the location of the visual indicator.

12. The computing device of claim 8, further comprising:
    in response to detecting a further continuation of the contact action after moving the visual indicator to the location of the user gaze, moving the visual indicator at a slower rate and in a direction indicated by an additional user input until the further continuation of the contact action is no longer detected.

13. The computing device of claim 12, wherein the additional user input is the detected movement of the user's gaze.

14. The computing device of claim 12, further comprising, after the continuation of the contact action is no longer detected, performing a second computer input function at the location of the visual indicator.

15. A non-transitory computer-readable storage medium storing program instructions, wherein the program instructions, when executed by one or more computing devices, implement:

detecting a user gaze relative to a display;
detecting a contact action from the user while a visual indicator is displayed at a first location of the display, the first location being different from a location of the user gaze;
   wherein the contact action is associated with performing a computer input function, and
   wherein the contact action comprises of at least one of: physical contact with a contact-required input device or close proximity to the contact-required input device;
upon detection of the contact action, continuing to display the visual indicator at the first location while displaying a visual marker at the location of the user gaze;
detecting that the contact action is maintained for a predefined period of time, wherein during the predefined period of time and while the visual indicator is displayed at the first location, performing the computer input function associated with the contact action is delayed and the visual indicator remains at the first location;
after the predefined time period and in response to detecting a cessation of the contact action during the predefined period of time, performing the computer input function associated with the contact action at the first location of the display; and
after the predefined time period and in response to detecting a continuation of the contact action after the predefined period of time, moving the visual indicator to the location of the user gaze.

16. The non-transitory computer-readable storage medium of claim 15, wherein the contact action may be any of depressing a button or touching a touch-sensitive device.

17. The non-transitory computer-readable storage medium of claim 15, wherein the predefined period of time is approximately 200 milliseconds (ms).

18. The non-transitory computer-readable storage medium of claim 15, further comprising, after moving the visual indicator to the location of the user gaze, performing a second computer input function at the location of the visual indicator.

19. The non-transitory computer-readable storage medium of claim 15, further comprising:
   in response to detecting a further continuation of the contact action after moving the visual indicator to the location of the user gaze, moving the visual indicator at a slower rate and in a direction indicated by an additional user input until the further continuation of the contact action is no longer detected.

20. The non-transitory computer-readable storage medium of claim 19, wherein the additional user input is the detected movement of the user's gaze.

21. The non-transitory computer-readable storage medium of claim 19, further comprising, after the further continuation of the contact action is no longer detected, performing a second computer input function at the location of the visual indicator.

* * * * *

UNITED STATES PATENT AND TRADEMARK OFFICE
CERTIFICATE OF CORRECTION

PATENT NO. : 9,619,020 B2
APPLICATION NO. : 14/195789
DATED : April 11, 2017
INVENTOR(S) : George-Svahn et al.

It is certified that error appears in the above-identified patent and that said Letters Patent is hereby corrected as shown below:

In the Claims

Column 30, Line 14, Claim 8 after the word display, please remove ":" and enter -;-.
Column 30, Line 20, Claim 8, please replace "dose" with -close-.

Signed and Sealed this
Tenth Day of April, 2018

Andrei Iancu
*Director of the United States Patent and Trademark Office*